(12) United States Patent　　　　(10) Patent No.:　US 12,658,135 B2

Yu　　　　　　　　　　　　　　　　(45) Date of Patent:　Jun. 16, 2026

(54) DISPLAY DEVICE AND METHOD OF DRIVING SAME

(71) Applicant: LG Display Co., Ltd., Seoul (KR)

(72) Inventor: Ki Tae Yu, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/065,754

(22) Filed: Feb. 27, 2025

(65) Prior Publication Data

US 2025/0279056 A1　　Sep. 4, 2025

(30) Foreign Application Priority Data

Feb. 29, 2024　(KR) ......................... 10-2024-0029863

(51) Int. Cl.
　　*G09G 3/3233*　　(2016.01)
　　*G06F 3/044*　　(2006.01)
　　*G09G 3/00*　　(2006.01)

(52) U.S. Cl.
　　CPC ......... *G09G 3/3233* (2013.01); *G06F 3/0443* (2019.05); *G09G 3/035* (2020.08); *G09G 2300/0408* (2013.01); *G09G 2300/0465* (2013.01); *G09G 2300/0819* (2013.01); *G09G 2300/0852* (2013.01); *G09G 2310/0286* (2013.01); *G09G 2310/06* (2013.01); *G09G 2320/02* (2013.01); *G09G 2330/023* (2013.01); *G09G 2354/00* (2013.01); *G09G 2360/14* (2013.01)

(58) Field of Classification Search
None
See application file for complete search history.

(56) References Cited

U.S. PATENT DOCUMENTS

| | | | | |
|---|---|---|---|---|
| 2014/0191935 A1* | 7/2014 | Morii | .................. | G09G 3/3677 345/92 |
| 2015/0377960 A1* | 12/2015 | Vahidsafa | ...... | G01R 31/318594 714/728 |
| 2017/0364034 A1* | 12/2017 | Gao | ........................ | H03M 1/10 |

FOREIGN PATENT DOCUMENTS

KR　　10-2020-0045259 A　　5/2020

* cited by examiner

*Primary Examiner* — Aneeta Yodichkas

(74) *Attorney, Agent, or Firm* — Birch, Stewart, Kolasch & Birch, LLP

(57)　　　　ABSTRACT

A display device can include a display panel configured to display an image, a driving circuit including an oscillator for generating an oscillator signal having a preset frequency and configured to generate a gate clock signal to drive the display panel based on the oscillator signal, and a jitter correction circuit configured to calculate a jitter of the oscillator signal based on an externally input reference frequency signal and the oscillator signal and control output power of the oscillator depending on a calculation result to correct the jitter of the oscillator signal.

15 Claims, 12 Drawing Sheets

DISPLAY DEVICE AND METHOD OF DRIVING SAME

CROSS-REFERENCE TO RELATED APPLICATIONS

This application claims priority to Korean Patent Application No. 10-2024-0029863, filed on Feb. 29, 2024, the entire contents of which are hereby expressly incorporated by reference into the present application.

BACKGROUND

Field

The present disclosure relates to a display device and a method of driving the same.

Discussion of the Related Art

As information technology develops, the market for display devices, which are communication media to communicate information with users, is growing. Accordingly, display devices such as a light emitting display (LED) device, a quantum dot display (QDD) device, and a liquid crystal display (LCD) device are increasingly used.

Display devices can include a display panel having subpixels and drivers for outputting driving signals for driving the display panel. The drivers can control the subpixels to transmit light or directly emit light by supplying the driving signals such as scan signals and data signals to the subpixels.

In order to improve the display quality of such display device, various technologies are being studied to reduce noise generated during the operation of the display device.

SUMMARY OF THE DISCLOSURE

Accordingly, the present disclosure is directed to a display device and a method of driving the same that substantially obviate or reduce one or more problems due to limitations and disadvantages of the related art.

An object of the present disclosure is to provide a display device and a driving method thereof that can improve the display quality of the display device by reducing panel noise.

Additional advantages, objects, and features of the present disclosure will be set forth in part in the description which follows and in part will become apparent to those having ordinary skill in the art upon examination of the following or can be learned from practice of the present disclosure. The objectives and other advantages of the present disclosure can be realized and attained by the structure particularly pointed out in the written description and claims hereof as well as the appended drawings.

To achieve these objects and other advantages and in accordance with the purpose of the present disclosure, as embodied and broadly described herein, a display device includes a display panel configured to display an image, a driving circuit including an oscillator generating an oscillator signal having a preset frequency and configured to generate a gate clock signal to drive the display panel based on the oscillator signal, and a jitter correction circuit configured to calculate a jitter of the oscillator signal based on an externally input reference frequency signal and the oscillator signal and control output power of the oscillator depending on a calculation result to correct the jitter of the oscillator signal.

According to aspects of the present disclosure, the jitter correction circuit can control the output power of the oscillator to increase when the jitter of the oscillator signal is greater than a target jitter value.

According to aspects of the present disclosure, the jitter correction circuit can include a first time-to-digital converter TDC configured to output a digital value corresponding to a duration of a pulse width of the oscillator signal, a second time-to-digital converter TDC configured to output a digital value corresponding to a duration of a pulse width of the reference frequency signal, and a jitter calculator configured to output current control data when a jitter calculated from a first TDC value output from the first TDC and a second TDC value output from the second TDC is out of a range of the target jitter value.

According to aspects of the present disclosure, the jitter correction circuit can further include a counter configured to count a number of pulses of the oscillator signal to calculate a count value, and the first TDC can output a digital value corresponding to a duration of accumulated pulse widths of the oscillator signal as the first TDC value.

According to aspects of the present disclosure, the jitter correction circuit can further include a bias setting circuit configured to generate bias adjustment data for controlling a current bias of the oscillator according to the current control data output from the jitter calculator, and a bias control circuit configured to adjust an amount of a bias current input to the oscillator according to the bias adjustment data.

According to aspects of the present disclosure, the jitter calculator can set an upper specification limit (USL) and a lower specification limit (LSL) based on the second TDC value, calculate a first TDC value out of a range of the USL or the LSL as jitter, and output the current control data when jitter accumulated for a certain period of time is out of the range of the target jitter value.

According to aspects of the present disclosure, the bias control circuit can further include a current mirror configured to control the current bias of the oscillator, wherein the bias control circuit can include a plurality of switches turned on or off according to the bias adjustment data to apply a current to the current mirror.

According to aspects of the present disclosure, the display device can further include a gate driver configured to receive the gate clock signal and apply at least one of a scan signal or an emission signal to the display panel.

According to aspects of the present disclosure, the oscillator can generate the oscillator signal using a frequency locked loop (FLL).

In another aspect of the present disclosure, a method of driving a display device includes generating an oscillator signal having a preset frequency, generating a gate clock signal to drive a display panel of the display device based on the oscillator signal, calculating a jitter of the oscillator signal based on an externally input reference frequency signal and the oscillator signal, and controlling output power of the oscillator depending on a calculation result to correct the jitter of the oscillator signal. When the jitter of the oscillator signal is greater than a target jitter value, the output power of the oscillator can be controlled to increase, to correct the jitter of the oscillator signal.

According to aspects of the present disclosure, the calculating of the jitter of the oscillator signal can include generating a digital value corresponding to a duration of a pulse width of the oscillator signal as a first TDC value, generating a digital value corresponding to a duration of a pulse width of the reference frequency signal as a second TDC value, and calculating jitter of the oscillator signal from the first TDC value and the second TDC value.

According to aspects of the present disclosure, the generating of the digital value corresponding to the duration of the pulse width of the oscillator signal as a first TDC value can include counting the oscillator signal and generating a digital value corresponding to a duration of accumulated pulse widths of the oscillator signal as the first TDC value.

According to aspects of the present disclosure, the calculating of jitter of the oscillator signal based on the externally input reference frequency signal and the oscillator signal can include setting a USL and an LSL based on the second TDC value, and calculating a first TDC value out of a range of the USL or the LSL as jitter and calculating jitter accumulated for a predetermined period of time, wherein the controlling output power of the oscillator can include applying a bias current to the oscillator to correct the jitter of the oscillator signal when an amount of the calculated accumulated jitter is out of the range of the target jitter value.

According to aspects of the present disclosure, the generating of the oscillator signal having the preset frequency can include generating the oscillator signal using a frequency locked loop (FLL).

According to aspects of the present disclosure, the gate clock signal can be generated based on the oscillator signal for which the jitter has been corrected.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate aspect(s) of the present disclosure and together with the description serve to explain the principle of the present disclosure. In the drawing:

FIG. 2 is a diagram showing a configuration of a gate driver in the display device according to an aspect of the present disclosure;

FIG. 4 is a circuit diagram of a subpixel in the display device according to an aspect of the present disclosure;

FIG. 8 is a block diagram schematically showing the configuration of the driver integrated circuit D-IC according to an aspect of the present disclosure;

DETAILED DESCRIPTION OF THE EMBODIMENTS

Figure 1:
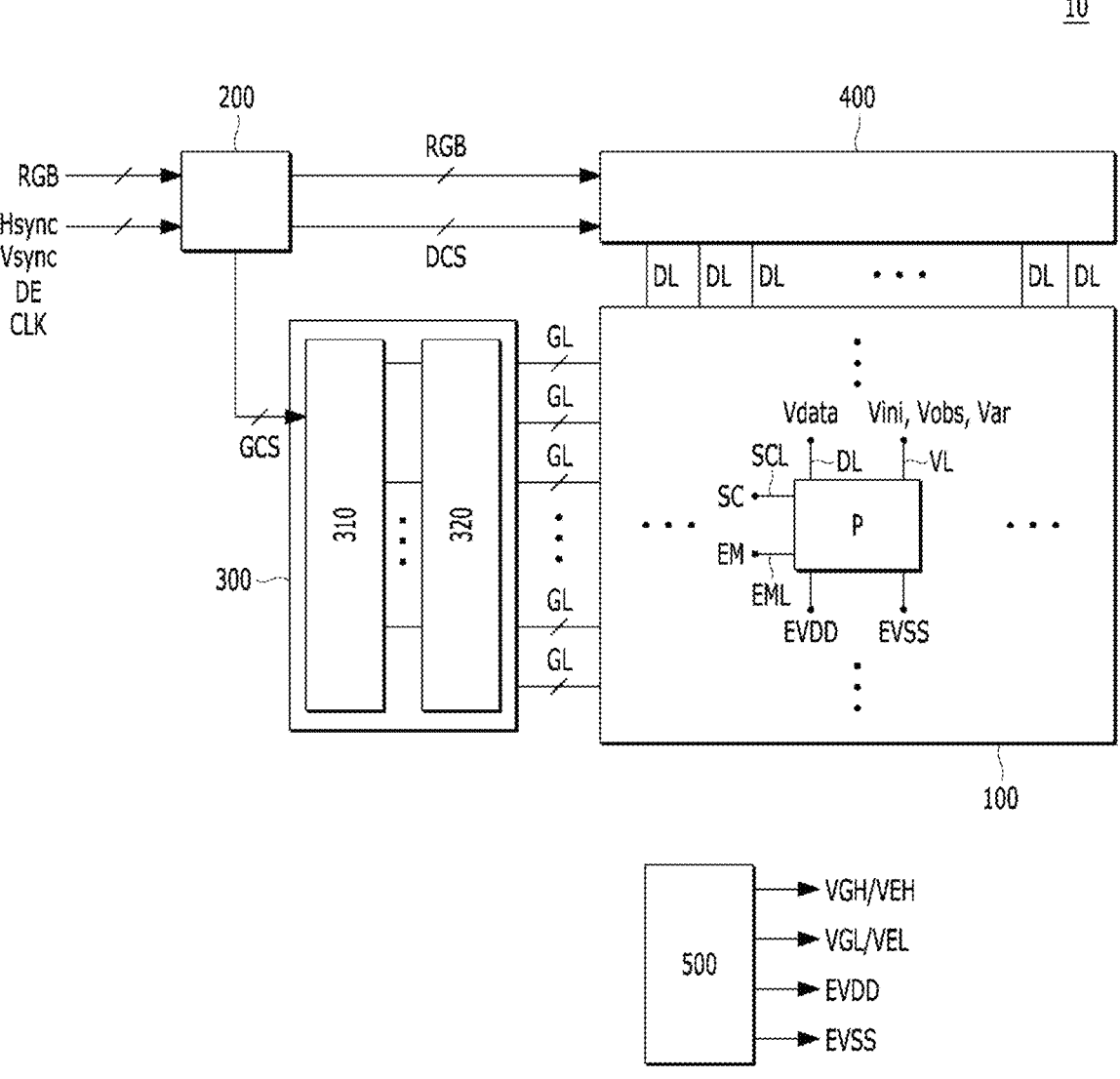
FIG. 1 is a block diagram schematically showing a display device according to an aspect of the present disclosure.

The advantages and features of the present disclosure and the way of attaining the same will become apparent with reference to aspects described below in detail in conjunction with the accompanying drawings. The present disclosure, however, is not limited to the aspects disclosed hereinafter and can be embodied in many different forms. Rather, these exemplary aspects are provided so that this disclosure will be through and complete and will fully convey the scope to those skilled in the art.

The shapes, sizes, ratios, angles, numbers, and the like, which are illustrated in the drawings in order to describe various aspects of the present disclosure, are merely given by way of example, and therefore, the present disclosure is not limited to the illustrations in the drawings. The same or extremely similar elements are designated by the same reference numerals throughout the specification. In the present specification, when the terms "comprise", "include", and the like are used, other elements can be added unless the term "only" is used. An element described in the singular form is intended to include a plurality of elements unless the context clearly indicates otherwise.

In the interpretation of constituent elements included in the various aspects of the present disclosure, the constituent elements are interpreted as including an error range even if there is no explicit description thereof.

In the description of the various aspects of the present disclosure, when describing positional relationships, for example, when the positional relationship between two parts is described using "on", "above", "below", "beside", or the like, one or more other parts can be located between the two parts unless the term "directly" or "closely" is used.

Although terms such as, for example, "first" and "second" can be used to describe various elements, these terms are merely used to distinguish the same or similar elements from each other. Therefore, in the present specification, an element modified by "first" can be the same as an element modified by "second" within the technical scope of the present disclosure unless otherwise mentioned. Further, the term "can" fully encompasses all the meanings of the term "may."

Now, various embodiments of the present disclosure will be discussed referring to the drawings. All the components of each device according to all embodiments of the present disclosure are operatively coupled and configured.

Figure 2:
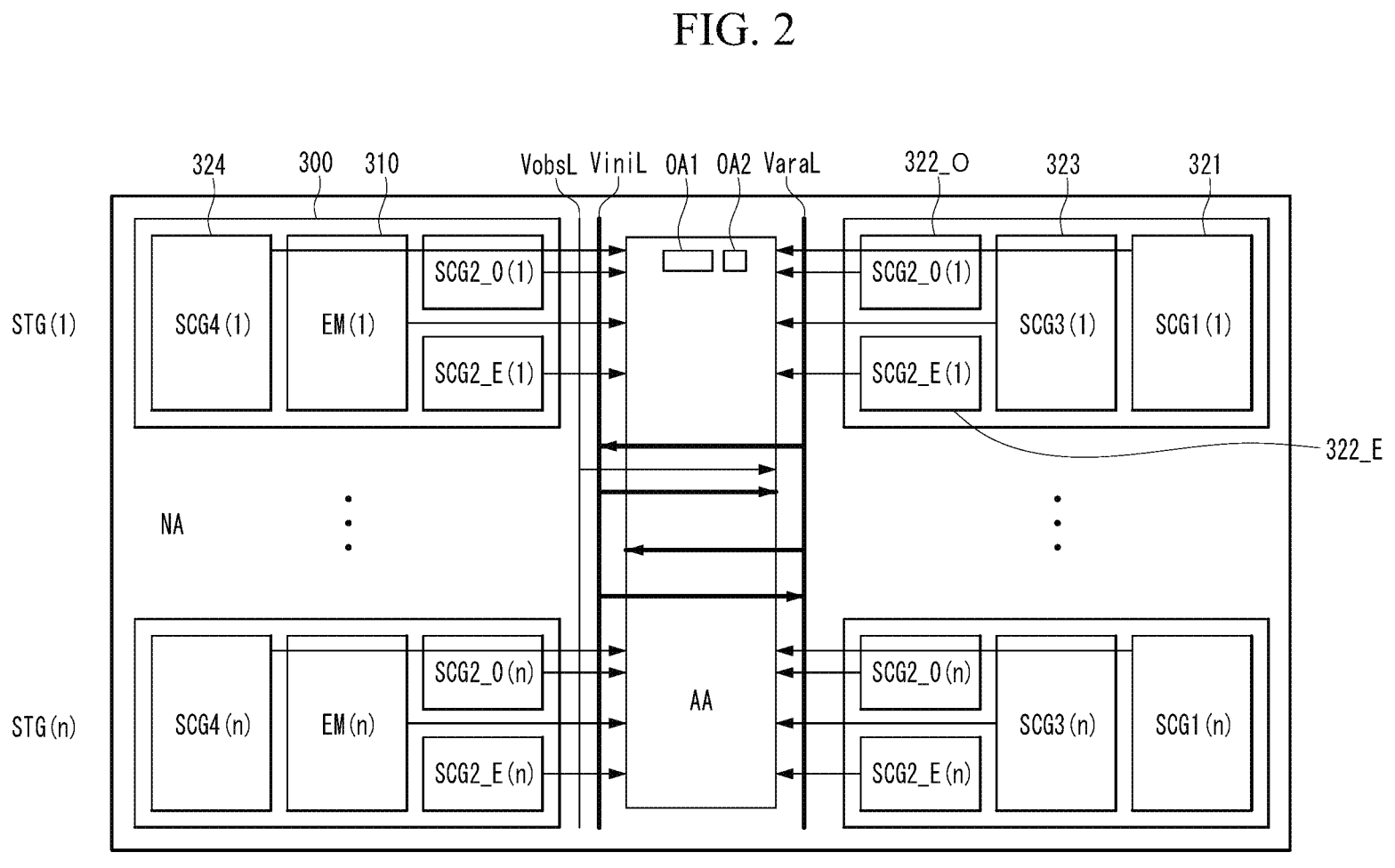

FIG. 1 is a block diagram schematically illustrating a display device according to an aspect of the present disclosure and FIG. 2 is a block diagram illustrating a configuration of a gate driver in the display device of FIG. 1.

Referring to FIG. 1, a display device 10 can include a display panel 100 including a plurality of subpixels P, a controller 200, a gate driver (gate driving circuit) 300 that supplies a gate signal to the plurality of subpixels P, a data driver 400 that supplies a data signal (or data voltage) to the plurality of subpixels P, and a power supply 500 that supplies power to the plurality of subpixels P.

The display panel 100 can include an active area (refer to AA of FIG. 2) where the plurality of subpixels P is disposed, and a non-active area (refer to NA of FIG. 2) arranged to surround the active area AA, in which the gate driver 300 and the data driver 400 are disposed. The non-active area NA can surround the active area AA entirely or in part(s).

In the display panel 100, a plurality of gate lines GL and a plurality of data lines DL intersect each other, and the plurality of subpixels P can be connected to the gate lines GL and the data lines DL. Specifically, one subpixel P can receive a gate signal from the gate driver 300 through a gate line GL, receive a data signal from the data driver 400 through a data line DL, and receive a high-potential voltage EVDD and a low-potential voltage EVSS from the power supply 500.

The gate lines GL can transmit scan signals SC and an emission control signal EM to the plurality of subpixels P, and the data lines DL can transmit a data voltage Vdata to the plurality of subpixels P. According to various aspects, the gate lines GL can include a plurality of scan lines SCL for supplying scan signals SC and a plurality of emission control lines EML for supplying the emission control signal EM. The plurality of subpixels P can receive voltages Vini, Var, and Vobs from a plurality of voltage lines VL. The voltages Vini, Var, and Vobs applied through the plurality of voltage lines VL will be described below.

Each of the plurality of subpixels P can include a subpixel driving circuit. The subpixel driving circuit can include a plurality of switching elements, a driving element, and a capacitor. The switching elements and the driving element can be configured as thin film transistors. A switching transistor can be switched according to a scan signal SC supplied through a scan line SCL and the emission control signal EM supplied through the emission control line EML. A driving transistor can control the amount of current supplied to a light emitting element OLED according to the data voltage Vdata (emission control).

The display panel 100 can be implemented as a non-transparent display panel or a transparent display panel. The transparent display panel can be applied to a transparent display device in which an image is displayed on a screen and an actual object in the background is visible. The display panel 100 can also be implemented as a flexible display panel. The flexible display panel can use a plastic substrate. Each of the plurality of subpixels P can be divided into a red subpixel, a green subpixel, and a blue subpixel for color expression. Each of the plurality of subpixels P can further include a white subpixel.

Touch sensors can be disposed on the display panel 100. Touch input can be sensed using separate touch sensors or can be sensed through the plurality of subpixels P. The touch sensors can be implemented as on-cell type or add on type touch sensors provided on the screen of the display panel or as in-cell type touch sensors built into the display panel 100.

The controller 200 can process image data RGB input from the outside such that the image data RGB suits the size and resolution of the display panel 100 and supply the same to the data driver 400. The controller 200 can generate a gate control signal GCS and a data control signal DCS using externally input synchronous signals, for example, a dot clock signal CLK, a data enable signal DE, a horizontal synchronous signal Hsync, and a vertical synchronous signal Vsync. The controller 200 can control the operation timing of the gate driver 300 by supplying the gate control signal GCS to the gate driver 300. The controller 200 can control the operation timing of the data driver 400 by supplying the data control signal DCS to the data driver 400. The controller 200 can synchronize the operation timing of the gate driver 300 with the operation timing of the data driver 400 using the gate control signal GCS and the data control signal DCS.

The controller 200 can be configured by being combined with various processors, such as a microprocessor, a mobile processor, and an application processor, depending on the device in which the controller 200 is mounted. A host system located in front of the controller 200 can be any one of a TV system, a set-top box, a navigation system, a personal computer (PC), a home theater system, a mobile device, a wearable device, and a vehicle system.

The controller 200 can control the operation timing of a display panel driver using a frame frequency corresponding to an input frame frequency$\times$i (i being a positive integer greater than 0) Hz by multiplying the input frame frequency by i. The input frame frequency can be 60 Hz in the NTSC (National Television Standards Committee) system and 50 Hz in the PAL (Phase-Alternating Line) system.

The controller 200 can drive the display panel 100 at various refresh rates. The controller 200 can drive the display panel 100 in a variable refresh rate (VRR) mode, for example, in the form of switchable between a first refresh rate and a second refresh rate. For example, the controller 200 can drive the display panel 100 at various refresh rates by simply changing the rate of a clock signal, configuring a synchronization signal such that a horizontal blank or a vertical blank is generated, or driving the gate driver 300 in a mask manner.

The voltage level of the gate control signal GCS output from the controller 200 can be converted into a gate-on voltage VGL/VEL and a gate-off voltage VGH/VEH through a level shifter and supplied to the gate driver 300. The level shifter can convert a low level voltage of the gate control signal GCS into a gate low voltage VGL and can convert a high level voltage of the gate control signal GCS into a gate high voltage VGH. The gate control signal GCS can include a start signal and a clock signal.

The gate driver 300 can supply a gate signal to the gate lines GL according to the gate control signal GCS supplied from the controller 200. The gate driver 300 can be disposed on one side or both sides of the display panel 100 in a gate-in-panel (GIP) structure.

The gate driver 300 can sequentially output gate signals to the plurality of gate lines GL under the control of the controller 200. The gate driver 300 can shift a gate signal using a shift register to sequentially supply the gate signals to the gate lines GL.

A gate signal can include a scan signal SC and an emission control signal EM in an organic light emitting display device. The scan signal SC can include a scan pulse that swings between the gate-on voltage VGL and the gate-off voltage VGH. The emission control signal EM can include an emission control signal pulse that swings between the gate-on voltage VEL and the gate-off voltage VEH. The scan pulse can be used to select subpixels P of a line to which a data voltage Vdata is to be written. The emission control signal EM can define an emission time of the subpixels P.

The gate driver 300 can include an emission control signal driver 310 and at least one scan driver 320. The emission control signal driver 310 can output the emission control signal pulse in response to the start signal and the clock signal from the controller 200 and sequentially shift the emission control signal pulse according to the clock signal. The at least one scan driver 320 can output a scan pulse in response to the start signal (or start pulse) and the clock signal (or shift clock) from the controller 200 and shift the scan pulse in accordance with clock signal timing.

The data driver 400 can convert image data RGB into a data voltage Vdata according to the data control signal DCS supplied from the controller 200 and output the same through the data lines DL.

Although FIG. 1 illustrates that the data driver 400 is disposed on one side of the display panel 100, the number and arrangement position of the data driver 400 are not limited thereto. For example, the data driver 400 can be composed of a plurality of integrated circuits ICs and disposed at a plurality of separate positions on one side of the display panel 100.

The power supply 500 can generate DC power required to drive the subpixel array of the display panel 100 and the display panel driver using a DC-DC converter. The DC-DC converter can include a charge pump, a regulator, a buck converter, and a boost converter. The power supply 500 can receive a DC input voltage applied from a host system and generate DC voltages such as gate-on voltages VGL and VEL, gate-off voltages VGH and VEH, a high-potential voltage EVDD, and a low-potential voltage EVSS. The gate-on voltages VGL and VEL and the gate-off voltages VGH and VEH can be supplied to a level shifter and the gate driver 300. The high-potential voltage EVDD and the low-potential voltage EVSS can be commonly supplied to the plurality of subpixels P.

Referring to FIG. 1 and FIG. 2, the gate driver 300 can include the emission control signal driver 310 and the scan driver 320. The scan driver 320 can include first to fourth scan drivers 321, 322, 323, and 324. In addition, the second scan driver 322 can include an odd-numbered second scan driver 322_O and an even-numbered second scan driver 322_E.

Shift registers constituting the gate driver 300 can be configured to be symmetrical on both sides of the active area AA. The shift register on one side can include the second scan drivers 322_O and 322_E, the fourth scan driver 324, and the emission control signal driver 310, and the shift register on the other side can include the first scan driver 321, the second scan drivers 322_O and 322_E, and the third can driver 323. FIG. 2 illustrates an example in which the odd-numbered second scan driver 322_O and the even-numbered second scan driver 322_E have a structure in which odd-numbered sub-pixels and even-numbered sub-pixels share the second scan driver 322. Therefore, the emission control signal driver 310 and the first to fourth scan drivers 321, 322, 323, and 324 can be disposed differently, and the present disclosure is not limited thereto.

Stages STG1 to STGn of the shift register can include first scan signal generators SCG1(1) to SCG1($n$), second scan signal generators SCG2_O(1) to SCG2_O($n$) and SCG2_E(1) to SC2_E(n), third scan signal generators SCG3(1) to SCG3($n$), fourth scan signal generators SCG4(1) to SCG4($n$), and emission control signal generators EMG(1) to EMG(n). In FIG. 2, the N-th stage STGn of the shift register is illustrated as the last stage. However, at least one dummy stage can be positioned in front of the first stage STG1 of the shift register and behind the N-th stage STGn of the shift register.

The first scan signal generators SCG1(1) to SCG1($n$) can output first scan signals SC1(1) to SC1($n$) through first scan lines SCL1 of the display panel 100. The second scan signal generators SCG2(1) to SCG2($n$) can output second scan signals SC2(1) to SC2($n$) through second scan lines SCL2 of the display panel 100. The third scan signal generators SCG3(1) to SCG3($n$) can output third scan signals SC3(1) to SC3($n$) through third scan lines SCL3 of the display panel 100. The fourth scan signal generators SCG4(1) to SCG4($n$)

can output fourth scan signals SC4(1) to SC4($n$) through fourth scan lines SCL4 of the display panel 100. The emission control signal generators EMG(1) to EMG(n) can output emission control signals EM(1) to EM(n) through emission control lines EML of the display panel 100.

The first scan signals SC1(1) to SC1($n$) can be used as signals for driving an A transistor (e.g., a compensation transistor or the like) included in the subpixel driving circuit. The second scan signals SC2(1) to SC2($n$) can be used as signals for driving a B transistor (e.g., a data supply transistor or the like) included in the subpixel driving circuit. The third scan signals SC3(1) to SC3($n$) can be used as signals for driving a C transistor (e.g., a bias transistor or the like) included in the subpixel driving circuit. The fourth scan signals SC4(1) to SC4($n$) can be used as signals for driving a D transistor (e.g., an initialization transistor or the like) included in the subpixel driving circuit. The emission control signals EM(1) to EM(n) can be used as signals for driving an E transistor (e.g., an emission control transistor or the like) included in the subpixel driving circuit. For example, if an emission control transistor is controlled using the emission control signals EM(1) to EM(n), the light emission time of a light emitting element can be varied.

A bias voltage line VobsL through which a bias voltage is transmitted, a first initialization voltage line VaraL through which a first initialization voltage is transmitted, and a second initialization voltage line ViniL through which a second initialization voltage is transmitted can be disposed between the gate driver 300 and the active area AA.

Here, the bias voltage line VobsL, the first initialization voltage line VaraL, and the second initialization voltage line ViniL are illustrated as being located on the left or right side of the active area AA, but the present disclosure is not limited thereto and they can be located on both sides. Even if they are located on one side, the location is not limited to the left or right.

Incidentally, one or more optical areas OA1 and OA2 can be disposed in the active area AA. The optical areas OA1 and OA2 can be disposed to overlap one or more optical electronic devices, such as an image-capturing device such as a camera (image sensor) and a detection sensor such as a proximity sensor and an illuminance sensor.

The optical areas OA1 and OA2 can have a light-transmitting structure formed therein for the operation of the optical electronic device and thus can have a transmittance of a certain level or higher. In other words, the number of pixels P per unit area in the optical areas OA1 and OA2 can be less than the number of pixels P per unit area in a general area excluding the optical areas OA1 and OA2 in the active area AA. For example, the resolution of the optical areas OA1 and OA2 can be lower than the resolution of the general area in the active area AA.

In the optical areas OA1 and OA2, the light-transmitting structure can be formed by patterning a cathode in a part where the subpixel is not disposed. At this time, the cathode to be patterned can be removed using a laser, or the cathode can be selectively formed and patterned by using a material such as a cathode deposition prevention layer.

In addition, the light-transmitting structure in the optical areas OA1 and OA2 can be formed by separately forming the light-emitting element included in the subpixel and the subpixel driving circuit. In other words, the light-emitting element of the subpixel can be positioned on the optical areas OA1 and OA2, a plurality of transistors constituting the subpixel driving circuit can be disposed around the optical areas OA1 and OA2, and the light-emitting element and the subpixel driving circuit can be electrically connected through a transparent metal layer.

Figure 3:
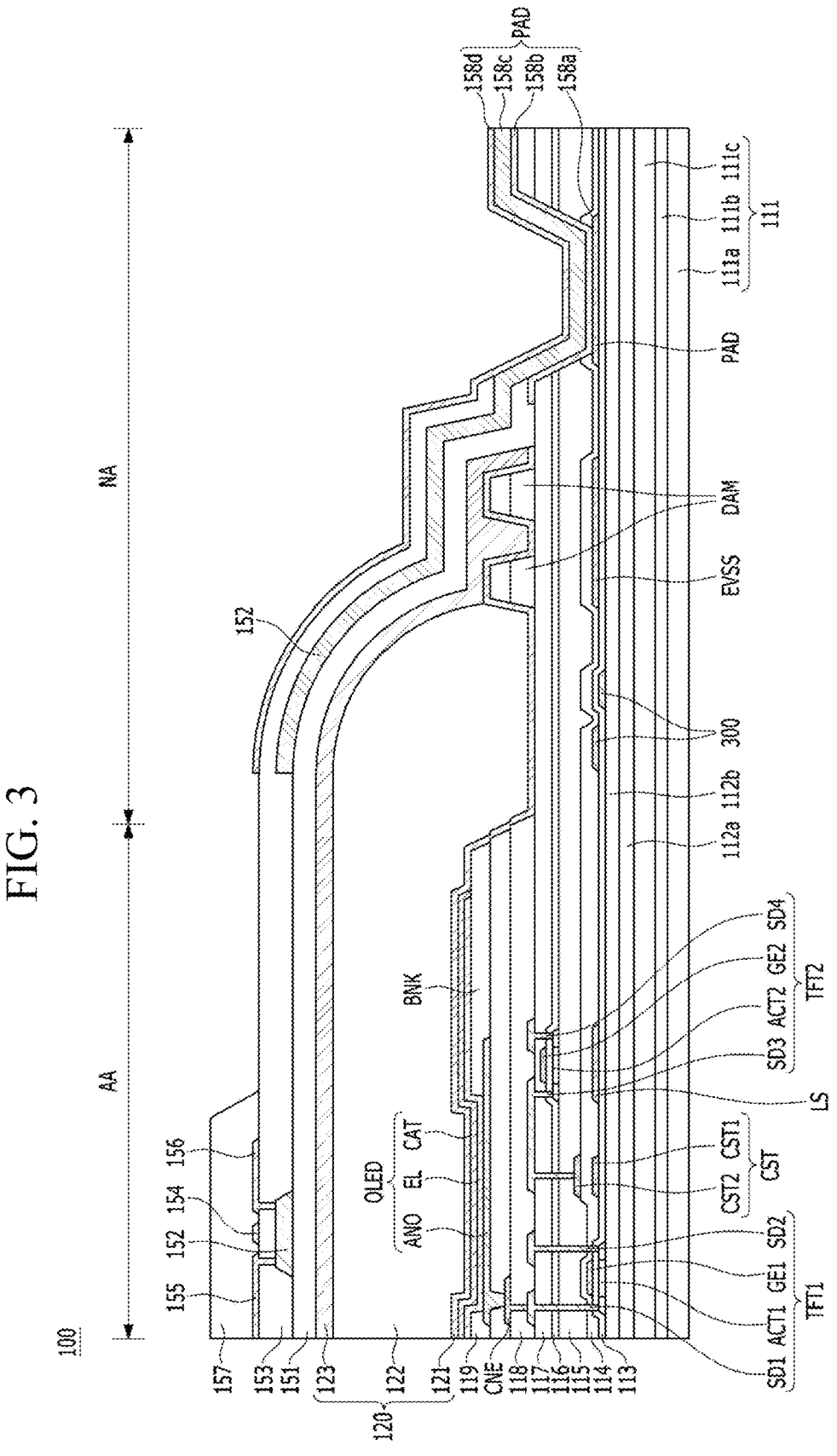
FIG. 3 is a cross-sectional view illustrating a laminated structure of the display panel of FIG. 1.

FIG. 3 is a cross-sectional view illustrating a laminated structure of the display panel according to an aspect of the present disclosure.

Referring to FIG. 3, transistors TFT1 and TFT2 and a capacitor CST for driving a light-emitting element OLED provided in the active area AA can be disposed on a substrate 111 of the display panel 100. The transistors TFT1 and TFT2 can include either a switching thin film transistor or a driving transistor containing a polycrystalline semiconductor material and an oxide thin film transistor containing an oxide semiconductor material. In this case, a thin film transistor containing a polycrystalline semiconductor material is referred to as a polycrystalline thin film transistor TFT1, and a thin film transistor containing an oxide semiconductor material is referred to as an oxide thin film transistor TFT2. For example, the polycrystalline thin film transistor TFT1 can be a transistor connected to the light-emitting element OLED, and the oxide thin film transistor TFT2 can be a transistor connected to the capacitor CST.

The substrate 111 can be formed of a multilayer in which organic films and inorganic films are alternately laminated. For example, the substrate 111 can be formed in a structure in which an organic film such as a polyimide film and an inorganic film such as a silicon oxide ($SiO_2$) film are alternately laminated.

A lower buffer layer 112a can be formed on the substrate 111. The lower buffer layer 112a can be formed by laminating multiple layers of silicon oxide ($SiO_2$) films to block moisture that can penetrate from the outside. An auxiliary buffer layer 112b can be further provided on the lower buffer layer 112a to protect the element from moisture penetration.

The polycrystalline thin film transistor TFT1 can be formed on the substrate 111. The polycrystalline thin film transistor TFT1 can use a polycrystalline semiconductor for an active layer. The polycrystalline thin film transistor TFT1 can include a first active layer ACT1 including a channel through which electrons or holes move, a first gate electrode GE1, a first source electrode SD1, and a first drain electrode SD2. A first gate insulating layer 113 can be formed between the first gate electrode GE1 and the first active layer ACT1 by laminating an inorganic layer such as a silicon oxide ($SiO_2$) film or a silicon nitride ($SiN_x$) film in a single or multiple layers.

The first active layer ACT1 can include a first channel region, a first source region and a first drain region disposed on both sides of the first channel region. The first source region and the first drain region are conductive regions formed by doping impurity ions of group 5 or group 3, such as phosphorus (P) or boron (B), into an intrinsic polycrystalline semiconductor material at a predetermined concentration. The first channel region can provide a path for electrons or holes to move while the polycrystalline semiconductor material maintains its intrinsic state.

According to an aspect, the polycrystalline thin film transistor TFT1 can be formed in a top gate structure in which the first gate electrode GE1 is positioned on the first active layer ACT1. Accordingly, a first electrode CST1 included in the capacitor CST and a light shielding layer LS included in the oxide thin film transistor TFT2 can be formed of the same material as the first gate electrode GE1. The number of mask processes can be reduced by forming the first gate electrode GE1, the first electrode CST1, and the light shielding layer LS through one mask process.

The first gate electrode GE1 can be formed of a metal material. For example, the first gate electrode GE1 can be a single layer or multilayer formed of one of molybdenum (Mo), aluminum (Al), chromium (Cr), gold (Au), titanium (Ti), nickel (Ni), neodymium (Nd), and copper (Cu), or an alloy thereof, but the present disclosure is not limited thereto. A first interlayer insulating layer 114 can be disposed on the first gate electrode GE1. The first interlayer insulating layer 114 can be formed of silicon oxide ($SiO_2$), silicon nitride ($SiN_x$), or the like.

The display panel 100 can further include an upper buffer layer 115, a second gate insulating layer 116, and a second interlayer insulating layer 117 sequentially disposed on the first interlayer insulating layer 114, and the polycrystalline thin film transistor TFT1 is formed on the second interlayer insulating layer 117 and can include a first source electrode SD1 and a first drain electrode SD2 connected to a first source region and a first drain region.

The first source electrode SD1 and the first drain electrode SD2 can be a single layer or multilayer formed of one of molybdenum (Mo), aluminum (Al), chromium (Cr), gold (Au), titanium (Ti), nickel (Ni), neodymium (Nd), and copper (Cu), or an alloy thereof, but the present disclosure is not limited thereto. The upper buffer layer 115 can separate the second active layer ACT2 of the oxide thin film transistor TFT2 formed of an oxide semiconductor material from the first active layer ACT1 formed of a polycrystalline semiconductor material and provide a basis for forming the second active layer ACT2.

The second gate insulating layer 116 can cover the second active layer ACT2 of the oxide thin film transistor TFT2. Since the second gate insulating layer 116 is formed on the second active layer ACT2 formed of an oxide semiconductor material, the second gate insulating layer 116 can be formed of an inorganic material. For example, the second gate insulating layer 116 can be formed of silicon oxide ($SiO_2$), silicon nitride ($SiN_x$), or the like.

A second gate electrode GE2 can be formed of a metal material. For example, the second gate electrode GE2 can be a single layer or multilayer made of one of molybdenum (Mo), aluminum (Al), chromium (Cr), gold (Au), titanium (Ti), nickel (Ni), neodymium (Nd), and copper (Cu), or an alloy thereof, but the present disclosure is not limited thereto.

The oxide thin film transistor TFT2 can be formed on the upper buffer layer 115. The oxide thin film transistor TFT2 can include the second active layer ACT2 formed of an oxide semiconductor material, the second gate electrode GE2 disposed on the second gate insulating layer 116, a second source electrode SD3 and a second drain electrode SD4 disposed on the second interlayer insulating layer 117. The second active layer ACT2 can be formed of an oxide semiconductor material and can include an intrinsic second channel region that is not doped with impurities and conductive second source and drain regions that are doped with impurities.

The oxide thin film transistor TFT2 can further include a light shielding layer LS positioned below the upper buffer layer 115 and overlapping the second active layer ACT2. The light shielding layer LS can block light incident on the active layer to secure the reliability of the oxide thin film transistor TFT2. The light shielding layer LS can be formed of the same material as the first gate electrode GE1 and can be formed on the upper surface of the first gate insulating layer 113. The light shielding layer LS can be electrically connected to the second gate electrode GE2 to form a dual gate.

The second source electrode SD3 and the second drain electrode SD4 can be simultaneously formed of the same material as the first source electrode SD1 and the first drain electrode SD2 on the second interlayer insulating layer 117, thereby reducing the number of mask processes.

A capacitor CST can be formed by disposing a second electrode CST2 on the first interlayer insulating layer 114 to overlap a first electrode CST1. The second electrode CST2 can be a single layer or multilayer made of, for example, one of molybdenum (Mo), aluminum (Al), chromium (Cr), gold (Au), titanium (Ti), nickel (Ni), neodymium (Nd), and copper (Cu), or an alloy thereof.

The capacitor CST can serve to store a data voltage applied through the data lines DL for a predetermined period of time. The capacitor CST can include two electrodes facing each other and a dielectric disposed therebetween. The first interlayer insulating layer 114 can be positioned between the first electrode CST1 and the second electrode CST2.

The first electrode CST1 or the second electrode CST2 of the capacitor CST can be electrically connected to the second source electrode SD3 or the second drain electrode SD4 of the oxide thin film transistor TFT2. However, the present disclosure is not limited thereto, and the connection relationship of the capacitor CST can vary depending on the subpixel driving circuit.

A first planarization layer 118 and a second planarization layer 119 can be sequentially disposed on the subpixel driving circuit to planarize the surface. The first planarization layer 118 and the second planarization layer 119 can be organic films such as polyimide or acrylic resin films. A light emitting element OLED can be formed on the second planarization layer 119.

The light emitting element OLED can include an anode ANO, a cathode CAT, and an emission layer EL disposed between the anode ANO and the cathode CAT. In the case of a subpixel driving circuit that commonly uses the low-potential voltage applied to the cathode CAT, the anode ANO is disposed as a separate electrode for each subpixel. On the other hand, in the case of a subpixel driving circuit that commonly uses the high-potential voltage, the cathode CAT can be disposed as a separate electrode for each subpixel.

The light emitting element OLED can be electrically connected to a driving element through an intermediate electrode CNE disposed on the first planarization layer 118. For example, the anode ANO of the light emitting element OLED and the first source electrode SD1 of the polycrystalline thin film transistor TFT1 constituting the subpixel driving circuit can be connected to each other through the intermediate electrode CNE.

The anode ANO can be connected to the intermediate electrode CNE exposed through a contact hole penetrating the second planarization layer 119. The intermediate electrode CNE can be connected to the first source electrode SD1 exposed through a contact hole penetrating the first planarization layer 118.

The intermediate electrode CNE can serve as a medium connecting the first source electrode SD1 and the anode ANO. The intermediate electrode CNE can be formed of a conductive material such as copper (Cu), silver (Ag), molybdenum (Mo), or titanium (Ti).

The anode ANO can be formed in a multilayer structure including a transparent conductive film and an opaque conductive film with high reflection efficiency. The transparent conductive film can be formed of a material having a relatively high work function, such as indium tin oxide (ITO) or indium zinc oxide (IZO), and the opaque conductive film can be formed of a single-layer or multilayer structure including aluminum (Al), silver (Ag), copper (Cu), lead (Pb), molybdenum (Mo), titanium (Ti), or an alloy thereof. For example, the anode ANO can be formed in a structure in which a transparent conductive film, an opaque conductive film, and a transparent conductive film are sequentially laminated, or can be formed in a structure in which a transparent conductive film and an opaque conductive film are sequentially laminated. The emission layer EL is formed by sequentially laminating a hole-related layer, an organic emission layer, and an electron-related layer on the anode ANO or laminating the layers in the reverse order.

A bank layer BNK can be a subpixel defining film that exposes the anode ANO of each subpixel. The bank layer BNK can be formed of an opaque material (e.g., black) to prevent optical interference between adjacent subpixels. In this case, the bank layer BNK can include a light shielding material such as a color pigment, organic black, or carbon.

The cathode CAT faces the anode ANO having the emission layer EL interposed therebetween and can be formed on the upper surface and side surface of the emission layer EL. The cathode CAT can be formed to cover the entire active area AA. When the cathode CAT is applied to a top emitting type organic light emitting display device, the cathode CAT can be formed of a transparent conductive material such as indium-tin-oxide (ITO) or indium-zinc-oxide (IZO).

A sealing layer 120 that suppresses moisture penetration can be further disposed on the cathode CAT. The sealing layer 120 can block moisture or oxygen from penetrating into the emission layer EL that is vulnerable to moisture or oxygen from the outside. To this end, the sealing layer 120 can include at least one inorganic sealing layer and at least one organic sealing layer, but the present disclosure is not limited thereto. The sealing layer 120 can include a first sealing layer 121, a second sealing layer 122, and a third sealing layer 123 that are sequentially laminated.

The first sealing layer 121 and the third sealing layer 123 can be formed of an inorganic insulating material that can be deposited at a low temperature, such as silicon nitride (SiN$_x$), silicon oxide (SiO$_x$), silicon oxynitride (SiON), or aluminum oxide (Al$_2$O$_3$). Since the first sealing layer 121 and the third sealing layer 123 are deposited in a low-temperature atmosphere, emission layer EL, which is vulnerable to a high-temperature atmosphere, can be prevented from being damaged during the deposition process of the first sealing layer 121 and the third sealing layer 123.

The second sealing layer 122 serves as a buffer for relieving stress between layers due to bending of the display device 10, and can flatten the step between layers. The second sealing layer 122 can be formed on the substrate 111 on which the first sealing layer 121 is formed, using a non-photosensitive organic insulating material such as an acrylic resin, an epoxy resin, a phenolic resin, a polyamide resin, a polyimide resin, polyethylene, or silicon oxycarbon (SiOC), or a photosensitive organic insulating material such as photoacrylic, but the present disclosure is not limited thereto.

When the second sealing layer 122 is formed through an inkjet method, a dam DAM can be formed to prevent the second sealing layer 122 in a liquid form from spreading to the edge of the substrate 111. The dam DAM can be disposed closer to the edge of the substrate 111 than the second sealing layer 122. The second sealing layer 122 can be prevented from spreading to a pad area where a conductive pad is disposed at the outermost edge of the substrate 111 by using the dam DAM.

The dam DAM is designed to prevent spreading of the second sealing layer 122, but if the second sealing layer 122 is formed to exceed the height of the dam DAM during the process, the second sealing layer 122, which is an organic layer, can be exposed to the outside, which causes moisture or the like to easily penetrate into the light emitting element. Therefore, to prevent this, ten or more dams DAM can be formed in an overlapping manner.

The dam DAM can be disposed on the second interlayer insulating layer 117 of the non-active area NA. The dam DAM can be formed simultaneously with the first planarization layer 118 and the second planarization layer 119. When the first planarization layer 118 is formed, a lower layer of the dam DAM can be formed simultaneously, and when the second planarization layer 119 is formed, an upper layer of the dam DAM can be formed simultaneously, and thus the dam DAM can be formed in a double-layer structure. Accordingly, the dam DAM can be formed of the same material as the first planarization layer 118 and the second planarization layer 119, but the present disclosure is not limited thereto.

The dam DAM can be formed to overlap a low-potential voltage line EVSS. For example, the low-potential voltage line EVSS can be positioned under the dam DAM in the non-active area NA. The low-potential voltage line EVSS can be disposed outside the gate driver 300 and can surround the active area AA. For example, the low-potential voltage line EVSS can be made of the same material as the first gate electrode GE1, but the present disclosure is not limited thereto, and the low-potential voltage line EVSS can be made of the same material as the second electrode CST2 or the first source and drain electrodes SD1 and SD2. The low-potential voltage line EVSS can be electrically connected to the cathode CAT to apply the low-potential voltage EVSS to the plurality of subpixels included in the active area AA.

A touch layer can be disposed on the sealing layer 120. In the touch layer, a touch buffer film 151 can be positioned between a touch sensor metal layer including touch electrode connection lines 152 and 154 and touch electrodes 155 and 156 and the cathode CAT of the light emitting element OLED.

The touch buffer film 151 can block chemicals (developing solution or etching solution) used in the process of manufacturing the touch sensor metal layer disposed on the touch buffer film 151 or moisture from the outside from penetrating into the emission layer EL containing an organic material. Accordingly, the touch buffer film 151 can prevent damage to the emission layer EL that is vulnerable to chemicals or moisture.

The touch buffer film 151 is formed of an organic insulating material that can be formed at a low temperature (e.g., below 100 degrees) to prevent damage to the emission layer EL containing an organic material vulnerable to high temperatures and has a low dielectric constant of 1 to 3. For example, the touch buffer film 151 can be formed of an acrylic-based, epoxy-based, or a siloxane-based material. The touch buffer film 151 having a flattening performance according to an organic insulating material can prevent damage to the sealing layer 120 due to bending of the device and breakage of the touch sensor metal formed on the touch buffer film 151.

According to a mutual-capacitance-based touch sensor structure, the touch electrodes 155 and 156 are formed on the touch buffer film 151, and the touch electrodes 155 and 156 can be arranged to cross each other. The touch electrode connection lines 152 and 154 can electrically connect the touch electrodes 155 and 156. The touch electrode connection lines 152 and 154 and the touch electrodes 155 and 156 can be positioned in different layers with a touch insulating film 153 interposed therebetween. The touch electrode connection lines 152 and 154 can be disposed to overlap the bank layer BNK, thereby preventing the aperture ratio from being reduced.

The touch electrodes 155 and 156 can be electrically connected to a touch driving circuit through a touch pad PAD by passing a part of the touch electrode connection line 152 through the upper and side surfaces of the sealing layer 120 and the upper and side surfaces of the dam DAM. A part of the touch electrode connection line 152 can receive a touch driving signal from the touch driving circuit and transmit the same to the touch electrodes 155 and 156, and can also transmit a touch sensing signal from the touch electrodes 155 and 156 to the touch driving circuit.

A touch protection film 157 can be disposed on the touch electrodes 155 and 156. The touch protection film 157 is illustrated as being disposed only on the touch electrodes 155 and 156, but the present disclosure is not limited thereto, and the touch protection film 157 can be extended to the front or back of the dam DAM and can also be disposed on the touch electrode connection line 152. A color filter can be further provided on the sealing layer 120, and the color filter can be positioned on the touch layer, or can be positioned between the sealing layer 120 and the touch layer.

The touch pad PAD can include a first pad layer 158a formed of the same material as the first gate electrode GE1 on the same layer as the first gate electrode GE1, a second pad layer 158b formed of the same material as the first source electrode SE1 and the first drain electrode DE1 on the same layer as the first source electrode SE1 and the first drain electrode DE1, a third pad layer 158c formed of the same material as the touch electrode connection line 152 on the same layer as the touch electrode connection line 152, and a fourth pad layer 158d formed of the same material as the touch electrodes 155 and 156 on the same layer as the touch electrodes 155 and 156.

In addition, a color filter can be further provided on the sealing layer 120, and the color filter can be positioned on the touch layer, or can be positioned between the sealing layer 120 and the touch layer.

Figure 4:
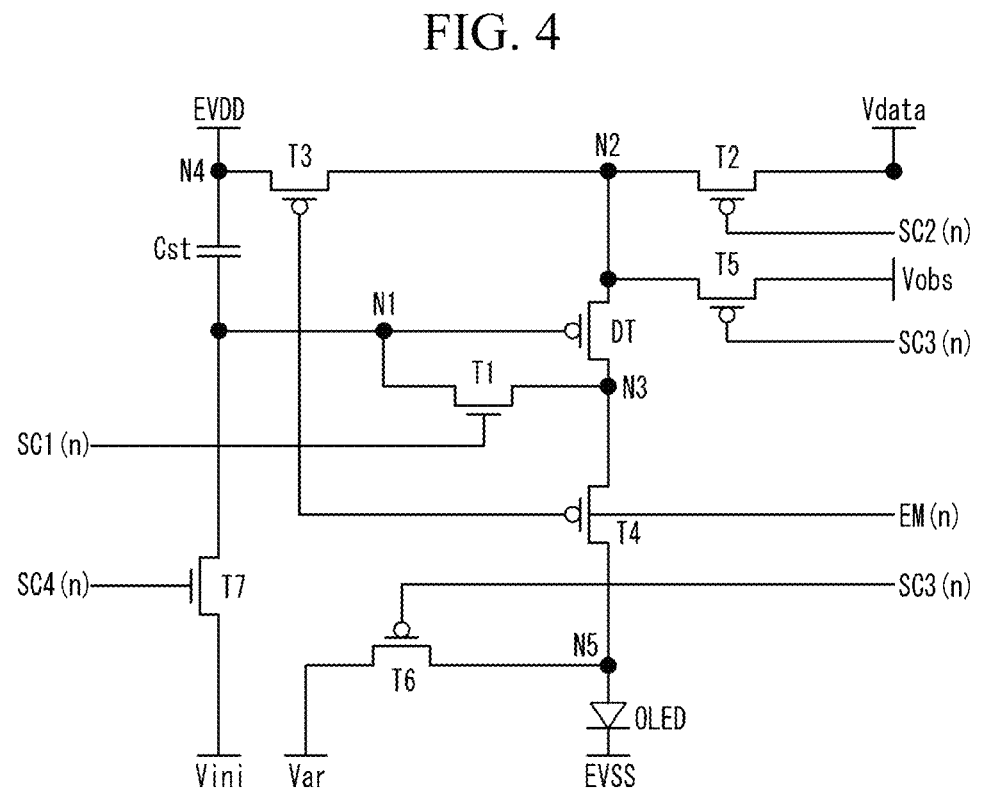

FIG. 4 is a diagram showing a subpixel driving circuit in the display device according to an aspect of the present disclosure.

Particularly, FIG. 4 shows an example of a subpixel driving circuit for explanation, and the subpixel driving circuit can have any structure in which an emission signal EM(n) is applied to control light emission of a light emitting element (OLED). For example, the subpixel driving circuit can include a switching thin film transistor to which an additional scan signal is applied and a switching thin film transistor to which an additional initialization voltage is applied, and a connection relationship of switching elements or a connection position of a capacitor can also be arranged in various manners. Hereinafter, a display device having the subpixel driving circuit structure of FIG. 4 will be described for convenience of explanation.

Referring to FIG. 4, each subpixel P can include a subpixel driving circuit having a driving transistor DT, and a light emitting element OLED connected to the subpixel driving circuit.

The subpixel driving circuit can control a driving current flowing through the light emitting element OLED to drive the light emitting element OLED. The subpixel driving circuit can include the driving transistor DT, first to seventh transistors T1 to T7, and a capacitor Cst. Each of the transistors DT and T1 to T7 can include a first electrode, a second electrode, and a gate electrode. One of the first electrode and the second electrode can be a source electrode, and the other of the first electrode and the second electrode can be a drain electrode.

Each of the transistors DT and T1 to T7 can be a P-type thin film transistor or an N-type thin film transistor. In the aspect of FIG. 3, the first transistor T1 and the seventh transistor T7 are N-type thin film transistors, and the remaining transistors DT and T2 to T6 are P-type thin film transistors. However, the present disclosure is not limited thereto, and all or some of the transistors DT and T1 to T7 can be P-type thin film transistors or N-type thin film transistors according to an aspect. In addition, the N-type thin film transistor can be an oxide thin film transistor, and the P-type thin film transistor can be a polycrystalline silicon thin film transistor.

Hereinafter, an example in which the first transistor T1 and the seventh transistor T7 are N-type thin film transistors, and the remaining transistors DT and T2 to T6 are P-type thin film transistors will be described. Therefore, the first transistor T1 and the seventh transistor T7 are turned on when a high voltage is applied thereto, and the remaining transistors DT and T2 to T6 are turned on when a low voltage is applied thereto.

According to an example, the first transistor T1 can serve as a compensation transistor, the second transistor T2 can serve as a data supply transistor, the third and fourth transistors T3 and T4 can serve as emission control transistors, the fifth transistor T5 can serve as a bias transistor, and the sixth and seventh transistors T6 and T7 can serve as initialization transistors.

The light emitting element OLED can include an anode and a cathode. The anode of the light emitting element OLED can be connected to a fifth node N5, and the cathode can be connected to a low-potential driving voltage EVSS.

The driving transistor DT can include a first electrode connected to a second node N2, a second electrode connected to a third node N3, and a gate electrode connected to a first node N1. The driving transistor DT can provide a driving current Id to the light emitting element OLED on the basis of a voltage at the first node N1 (or a data voltage stored in the capacitor Cst which will be described later).

The first transistor T1 can include a first electrode connected to the first node N1, a second electrode connected to the third node N3, and a gate electrode to which a first scan signal SC1($n$) is applied. The first transistor T1 is turned on in response to the first scan signal SC1($n$) and is diode-connected between the first node N1 and the third node N3 to sample the threshold voltage Vth of the driving transistor DT. The first transistor T1 can be a compensation transistor.

The capacitor Cst can be connected or formed between the first node N1 and a fourth node N4. The capacitor Cst can store or maintain a provided high-potential driving voltage EVDD.

The second transistor T2 can include a first electrode connected to a data line DL (or receiving a data voltage Vdata), a second electrode connected to the second node N2, and a gate electrode receiving a second scan signal SC2($n$). The second transistor T2 can be turned on in response to the second scan signal SC2($n$) and can transmit the data voltage Vdata to the second node N2. The second transistor T2 can be a data supply transistor.

The third transistor T3 and the fourth transistor T4 (or first and second emission control transistors) can be connected between the high-potential driving voltage EVDD and the light emitting element OLED and can form a current path along which the driving current Id generated by the driving transistor DT flows.

The third transistor T3 can include a first electrode connected to the fourth node N4 and receiving the high-potential driving voltage EVDD, a second electrode connected to the second node N2, and a gate electrode receiving an emission control signal EM(n).

The fourth transistor T4 can include a first electrode connected to the third node N3, a second electrode connected to the fifth node N5 (or the anode of the light emitting element OLED), and a gate electrode receiving the emission control signal EM(n).

The third and fourth transistors T3 and T4 are turned on in response to the emission control signal EM(n), and in this case, the driving current Id is provided to the light emitting element OLED, and the light emitting element OLED can emit light with a luminance corresponding to the driving current Id.

The fifth transistor T5 can include a first electrode receiving a bias voltage Vobs, a second electrode connected to the second node N2, and a gate electrode receiving a third scan signal SC3($n$). The fifth transistor T5 can be a bias transistor.

The sixth transistor T6 can include a first electrode receiving a first initialization voltage Var, a second electrode connected to the fifth node N5, and a gate electrode receiving the third scan signal SC3($n$).

The sixth transistor T6 can be turned on in response to the third scan signal SC3($n$) before the light emitting element OLED emits light (or after the light emitting element OLED emits light), and can initialize the anode (or pixel electrode) of the light emitting element OLED using the first initialization voltage Var. The light emitting element OLED can have a parasitic capacitor formed between the anode and the cathode thereof. While the light emitting element OLED emits light, the parasitic capacitor is charged and thus the anode of the light emitting element OLED can have a specific voltage. Therefore, by applying the first initialization voltage Var to the anode of the light emitting element OLED through the sixth transistor T6, the amount of charge accumulated in the light emitting element OLED can be initialized.

In the present disclosure, the gate electrodes of the fifth and sixth transistors T5 and T6 are configured to receive the third scan signal SC3($n$) in common. However, the present disclosure is not necessarily limited thereto, and the gate electrodes of the fifth and sixth transistors T5 and T6 can be configured to receive separate scan signals and be controlled independently.

The seventh transistor T7 can include a first electrode receiving a second initialization voltage Vini, a second electrode connected to the first node N1, and a gate electrode receiving a fourth scan signal SC4 ($n$).

The seventh transistor T7 can be turned on in response to the fourth scan signal SC4($n$) and initialize the gate electrode of the driving transistor DT using the second initialization voltage Vini. The gate electrode of the driving transistor DT can have unnecessary charges remaining due to the high-potential driving voltage EVDD stored in the capacitor Cst. Therefore, the amount of remaining charge can be initialized by applying the second initialization voltage Vini to the gate electrode of the driving transistor DT through the seventh transistor T7.

Figure 5A:
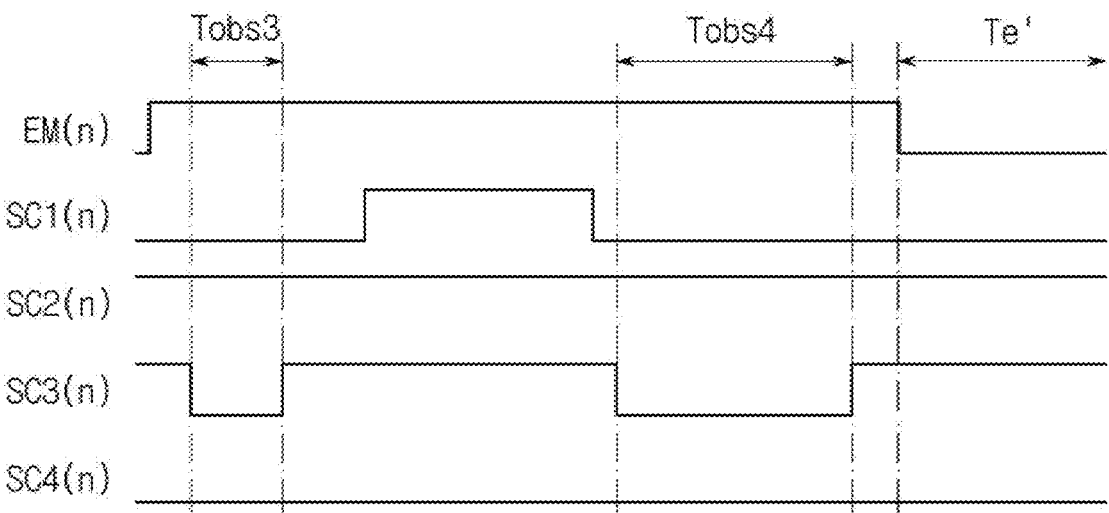
FIG. 5A and FIG. 5B are diagrams illustrating operations of a scan signal and an emission control signal in a refresh period and a hold period in the subpixel circuit shown in FIG. 4.
Figure 5B:
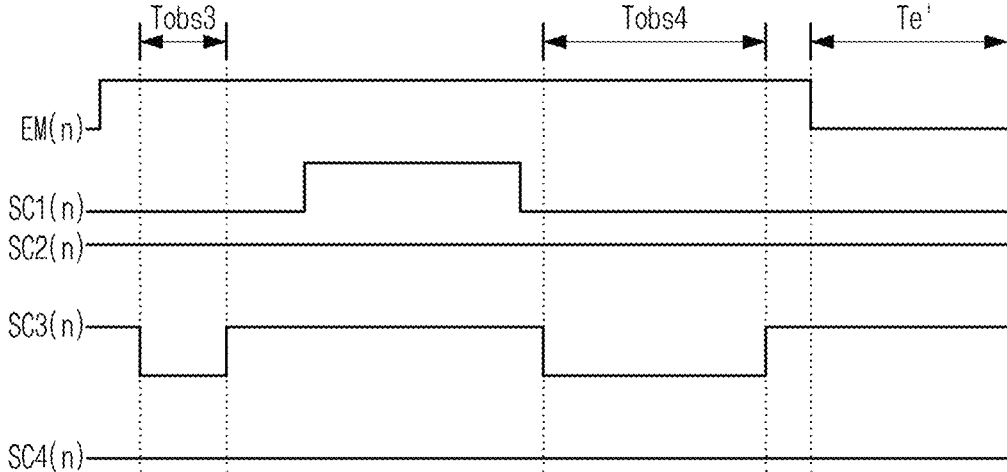

FIG. 5A and FIG. 5B are diagrams illustrating operations of scan signals and an emission control signal in a refresh period and a hold period in the subpixel driving circuit illustrated in FIG. 4.

The display device according to the aspect of the present disclosure can operate as a variable refresh rate (VRR) mode display device. In the VRR mode, the display device operates at a constant frequency, and when high-speed operation is required, a refresh rate at which the data voltage Vdata is updated is increased to operate the subpixels, or when power consumption is reduced or low-speed operation is required, the refresh rate is lowered to operate the subpixels.

Each subpixel P can be operated within 1 second through a combination of a refresh frame and a hold frame. In the present disclosure, one set period is defined as a combination of a refresh period in which the data voltage Vdata is updated and a hold period in which the data voltage Vdata is not updated, which is repeated for 1 second. One set period is a cycle in which a combination of the refresh period and the hold period is repeated.

When the refresh rate is 120 Hz, operation can be performed using only the refresh period. For example, the refresh period can be provided 120 times within 1 second. The duration of one refresh period is $\frac{1}{120}=8.33$ ms, and one set period is also 8.33 ms.

When the refresh rate is 60 Hz, the refresh period and the hold period can alternate. For example, the refresh period and the hold period can alternate 60 times within 1 second. The duration of one refresh period and one hold period is $0.5/60=8.33$ ms, and one set period is 16.66 ms.

When the refresh rate is 1 Hz, one frame can include one refresh period and 119 hold periods following the one refresh period. In addition, when the refresh rate is 1 Hz, one frame can include a plurality of refresh periods and a plurality of hold periods. Here, the duration of one refresh period and one hold period is $\frac{1}{120}=8.33$ ms, and one set period is 1 s.

A new data voltage Vdata is charged and applied to the driving transistor DT in the refresh period, whereas the data voltage Vdata of the previous frame is maintained and used in the hold period. The hold period is also called a skip period in the sense that the process of applying a new data voltage Vdata to the driving transistor DT is skipped.

Each subpixel P can initialize the voltage charged or remaining in the subpixel driving circuit during the refresh period. Specifically, each subpixel P can remove the influence of the data voltage Vdata and the high-potential driving voltage EVDD stored in the previous frame during the refresh period. Therefore, each subpixel P can display an image corresponding to a new data voltage Vdata during the hold period.

Each of the plurality of subpixels P can display an image by providing a driving current corresponding to the data voltage Vdata to the light emitting element OLED during the hold period and can maintain the turn-on state of the light emitting element OLED.

First, operations of the subpixel driving circuit and the light emitting element during the refresh period illustrated in FIG. 5A will be described. The refresh period can include at least one bias period Tobs1 and Tobs2, an initialization period Ti, a sampling period Ts, and an emission period Te, but this is merely an example and the present disclosure is not necessarily limited thereto.

Referring to FIG. 5A, the subpixel driving circuit can operate in at least one bias period Tobs1 and Tobs2 during the refresh period.

At least one bias period Tobs1 and Tobs2 is a period during which an on-bias stress operation OBS in which a bias voltage Vobs is applied is performed, and in this period, the emission control signal EM(n) is at a high voltage, and the third and fourth transistors T3 and T4 are turned off. The first scan signal SC1($n$) and the fourth scan signal SC4($n$) are at a low voltage, and the first transistor T1 and the seventh transistor T7 are turned off. The second scan signal SC2($n$) is at a high voltage, and the second transistor T2 is turned off.

The third scan signal SC3($n$) is input as a low voltage, and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is supplied to the third node N3, which is the drain electrode of the driving transistor DT, and thus the charging time or charging delay of the voltage of the fifth node N5, which is the anode of the light emitting element OLED, can be reduced during the emission period. The driving transistor DT is maintained in a stronger saturation state.

For example, as the bias voltage Vobs increases, the voltage of the third node N3, which is the drain electrode of the driving transistor DT, can increase, and the gate-source voltage or drain-source voltage of the driving transistor DT can decrease. Therefore, it is desirable that the bias voltage Vobs be at least greater than the data voltage Vdata.

At this time, the magnitude of the drain-source current Id passing through the driving transistor DT can be reduced, and the stress of the driving transistor DT in a positive bias stress situation can be reduced, thereby resolving the charging delay of the voltage of the third node N3. In other words, by performing the on-bias stress operation OBS before sampling the threshold voltage Vth of the driving transistor DT, the hysteresis of the driving transistor DT can be alleviated.

Therefore, the on-bias stress operation OBS in at least one bias period Tobs1 and Tobs2 can be defined as an operation of directly applying an appropriate bias voltage to the driving transistor DT during non-emission periods.

In addition, when the sixth transistor T6 is turned on in at least one bias period Tobs1 and Tobs2, the anode (or pixel electrode) of the light emitting element OLED connected to the fifth node N5 is initialized to the first initialization voltage Var.

However, the gate electrodes of the fifth and sixth transistors T5 and T6 can be configured to receive separate scan signals and be controlled independently. For example, it is not necessarily required to apply the bias voltage to the first electrode of the driving transistor DT and the anode of the light emitting element OLED at the same time in bias periods.

The subpixel driving circuit can operate in the initialization period T1 during the refresh period. The initialization period T1 is a period in which the voltage of the gate electrode of the driving transistor DT is initialized. The first scan signal SC1($n$) to the fourth scan signal SC4($n$) and the emission control signal EM(n) are at a high voltage, and the first transistor T1 and the seventh transistor T7 are turned on. The second to sixth transistors T2, T3, T4, T5, and T6 are turned off. As the first and seventh transistors T1 and T7 are turned on, the gate electrode and the second electrode of the driving transistor DT connected to the first node N1 are initialized to the second initialization voltage Vini.

The subpixel driving circuit can operate in the sampling period Ts during the refresh period. The sampling period is a period in which the threshold voltage Vth of the driving transistor DT is sampled.

The first scan signal SC1($n$), the third scan signal SC3($n$), and the emission control signal EM(n) are at a high voltage, and the second scan signal SC2($n$) and the fourth scan signal SC4 (*n*) are at a low voltage. Accordingly, the third to seventh transistors T3, T4, T5, T6, and T7 are turned off, the first transistor T1 is maintained in a turn-on state, and the second transistor T2 is turned on. For example, as the second transistor T2 is turned on, the data voltage Vdata is applied to the driving transistor DT and the first transistor T1 is diode-connected between the first node N1 and the third node N3, and thus the threshold voltage Vth of the driving transistor DT can be sampled.

The subpixel driving circuit can operate in the emission period Te during the refresh period. The emission period Te is a period in which the sampled threshold voltage Vth is offset and the light emitting element OLED is caused to emit light using a driving current corresponding to a sampled data voltage.

Here, the emission control signal EM(n) is at a low voltage and the third and fourth transistors T3 and T4 are turned on.

As the third transistor T3 is turned on, the high-potential driving voltage EVDD connected to the fourth node N4 is applied to the first electrode of the driving transistor DT connected to the second node N2 through the third transistor T3. The driving current Id supplied from the driving transistor DT to the light emitting element OLED via the fourth transistor T4 becomes independent of the value of the threshold voltage Vth of the driving transistor DT, and thus the threshold voltage Vth of the driving transistor DT is compensated for.

Next, operations of the subpixel driving circuit and the light emitting element in the hold period will be described with reference to FIG. 5B.

Referring to FIG. 5B, the hold period can include at least one bias period Tobs3 and Tobs4 and an emission period Te'. The description of operation of the subpixel driving circuit, which is the same as the operation in the refresh period, will be omitted.

As described above, a new data voltage Vdata is charged and applied to the gate electrode of the driving transistor DT in the refresh period, whereas the data voltage Vdata of the refresh period is maintained and used in the hold period. Therefore, the hold period does not require an initialization period T1 and a sampling period Ts unlike the refresh period.

In the hold period, it is sufficient to perform the on-bias stress operation OBS only once. However, in the present aspect, the third scan signal SC3(*n*) in the hold period is the same as the third scan signal SC3(*n*) in the refresh period, and thus the on-bias stress operation OBS can be performed twice as in the refresh period.

Differences between driving signals in the refresh period described with reference to FIG. 5A and driving signals in the hold period in FIG. 5B are second and fourth scan signals SC2(*n*) and SC4(*n*). Since the initialization period T1 and the sampling period Ts are unnecessary in the hold period, the second scan signal SC2(*n*) is always at a high voltage and the fourth scan signal SC4 (*n*) is always at a low voltage unlike in the case of the refresh period. In other words, the second and seventh transistors T2 and T7 are always turned off.

In the display device having such a configuration, among the components shown in FIG. 1, the controller 200 and the data driver 400 can be integrated into a single IC and implemented as a driver integrated circuit D-IC.

Figure 6:
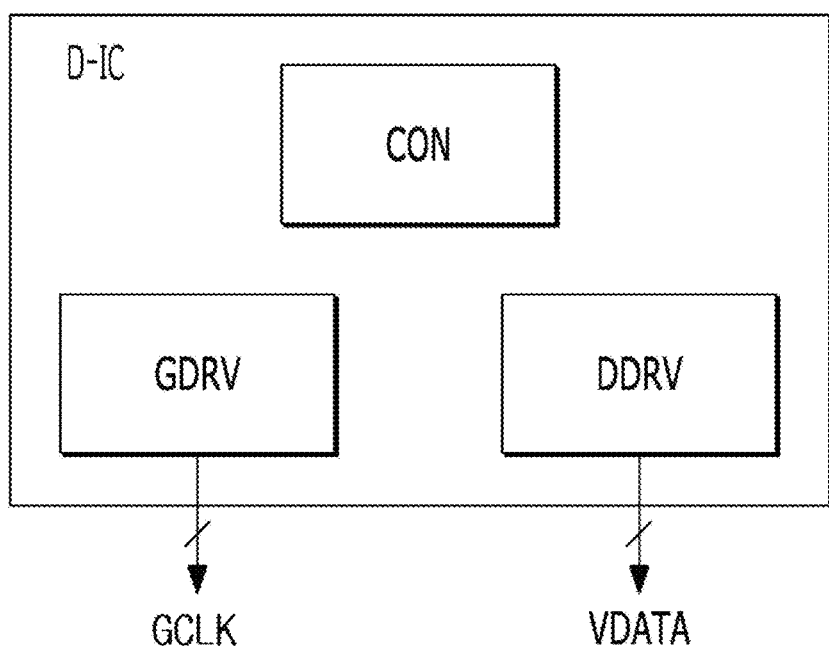
FIG. 6 is a diagram showing a configuration of a driver integrated circuit D-IC in the display device according to an aspect of the present disclosure.

FIG. 6 is a diagram showing a configuration of a driver integrated circuit D-IC in the display device according to an aspect of the present disclosure.

Referring to FIG. 6, the driver integrated circuit D-IC can include a control circuit CON, a first driving circuit DDRV, and a second driving circuit GDRV in one chipset.

The control circuit CON can serve to control the first driving circuit DDRV and the second driving circuit GDRV on the basis of a control signal applied from the outside, etc. The first driving circuit DDRV can serve to generate a data voltage VDATA based on a data signal applied from the outside under the control of the control circuit CON. The second driving circuit GDRV can generate a GIP signal GCLK for driving the gate driver 300 of FIG. 2 under the control of the control circuit CON. Accordingly, the gate driver 300 can output a scan signal SC and an emission control signal EM on the basis of the GIP signal GCLK applied from the second driving circuit GDRV.

Figure 7:
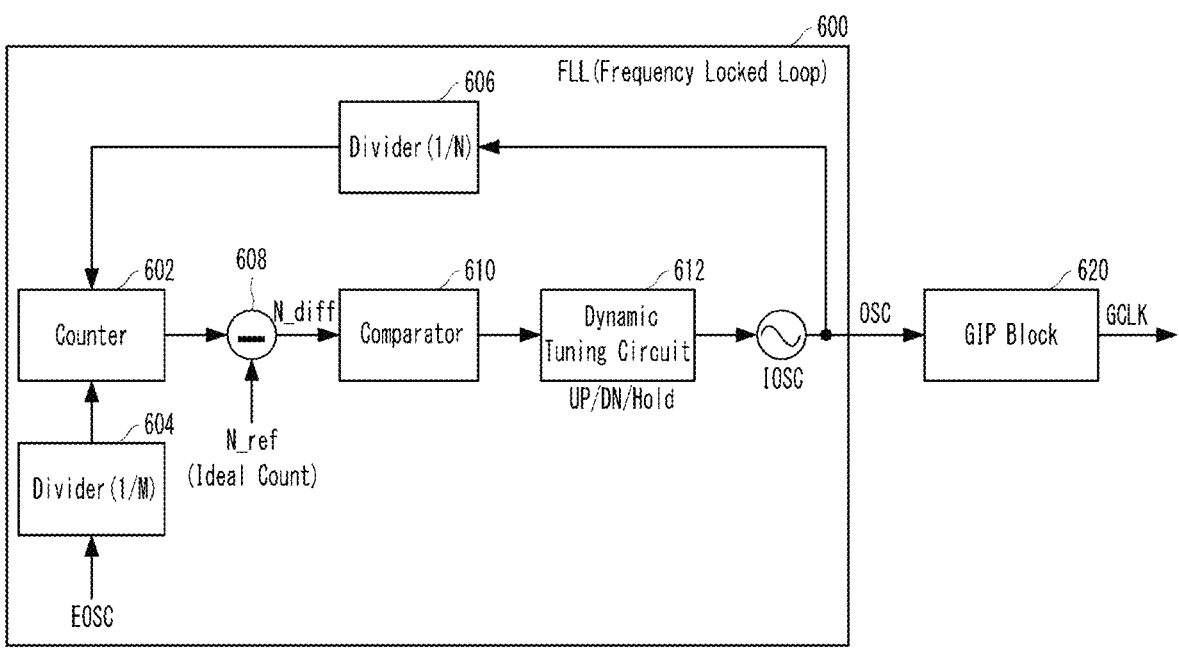
FIG. 7 is a block diagram schematically showing components for generating a gate-in-panel (GIP) signal GCLK in the driver integrated circuit D-IC.

FIG. 7 is a block diagram schematically illustrating components for generating the GIP signal GCLK in the driver integrated circuit D-IC.

Referring to FIG. 7, the driver integrated circuit D-IC can include a frequency generation circuit (also indicated as frequency locked loop (FLL) in FIG. 7) 600 and a GIP signal generation circuit (also indicated as GIP block in the drawings) 620.

The frequency generation circuit 600 can generate a signal of a required frequency band based on an external oscillator signal EOSC applied from the outside. The frequency generation circuit 600 can generate an internal oscillator signal OSC required for operation of the GIP signal generation circuit 620 with a frequency band set internally. The GIP signal generation circuit 620 can generate a GIP signal GCLK based on the internal oscillator signal OSC generated from the frequency generation circuit 600.

The frequency generation circuit 600 can include a first divider 604, a counter 602, a differentiator 608, a second divider 606, a comparator 610, a dynamic tuning circuit 612, and an internal oscillator IOSC.

The first divider 604 can divide an external oscillator signal EOSC by M and output the same to the counter 602. The value M can be set depending on the frequency of the internal oscillator signal OSC to be generated.

The second divider 606 can divide the oscillator signal OSC output from the internal oscillator IOSC by N and output the same to the counter 602. The oscillator signal OSC output from the internal oscillator IOSC is a signal output from the frequency generation circuit 600 to the GIP signal generation circuit 620. The value N can be set depending on the value M.

The counter 602 can count the external oscillator signal EOSC divided by the first divider 604 and the internal oscillator signal OSC divided by the second divider 606. The counter 602 can apply the count result to the differentiator 608.

The differentiator 608 can calculate the difference value N_diff between a count value of the external oscillator signal EOSC divided by the first divider 604 and a count value of the internal oscillator signal OSC divided by the second divider 606. When calculating the difference value N_diff, the differentiator 608 can refer to a reference count value N ref (Ideal Count). The reference count value N ref (Ideal Count) can be set to a difference value calculated when the oscillator signal OSC from the internal oscillator IOSC is output at a target frequency.

The comparator 610 can compare the difference value N_diff with a reference value set internally and output a result value according to the comparison result.

The dynamic tuning circuit 612 can generate an output value to be applied to the internal oscillator IOSC on the basis of the comparison result value output from the comparator 610. The dynamic tuning circuit 612 can generate an output value for increasing (UP), decreasing (DN), or holding (Hold) the frequency of the internal oscillator IOSC on the basis of the comparison result value output from the comparator 610. For example, the dynamic tuning circuit 612 can output a high voltage value when the frequency is high and output a low voltage value when the frequency is low by using a dynamic tuning capacitor provided therein.

The internal oscillator IOSC can generate the internal oscillator signal OSC. The internal oscillator IOSC can adjust the frequency of the internal oscillator signal OSC on the basis of the output value output from the dynamic tuning circuit 612.

The frequency generation circuit 600 having the above configuration can generate the internal oscillator signal OSC using a frequency locked loop (FLL). For example, the external oscillator signal EOSC applied from the outside can be compared with the internal oscillator signal OSC output from the internal oscillator IOSC to compensate for the internal oscillator signal OSC such that the internal oscillator signal OSC converges on a target frequency.

The internal oscillator signal OSC output from the frequency generation circuit 600 having the above configuration has a natural dispersion due to differences in the operation characteristics of oscillators and manufacturing processes. Accordingly, although the frequency is fixed, a phase error or jitter can occur.

Figure 8:
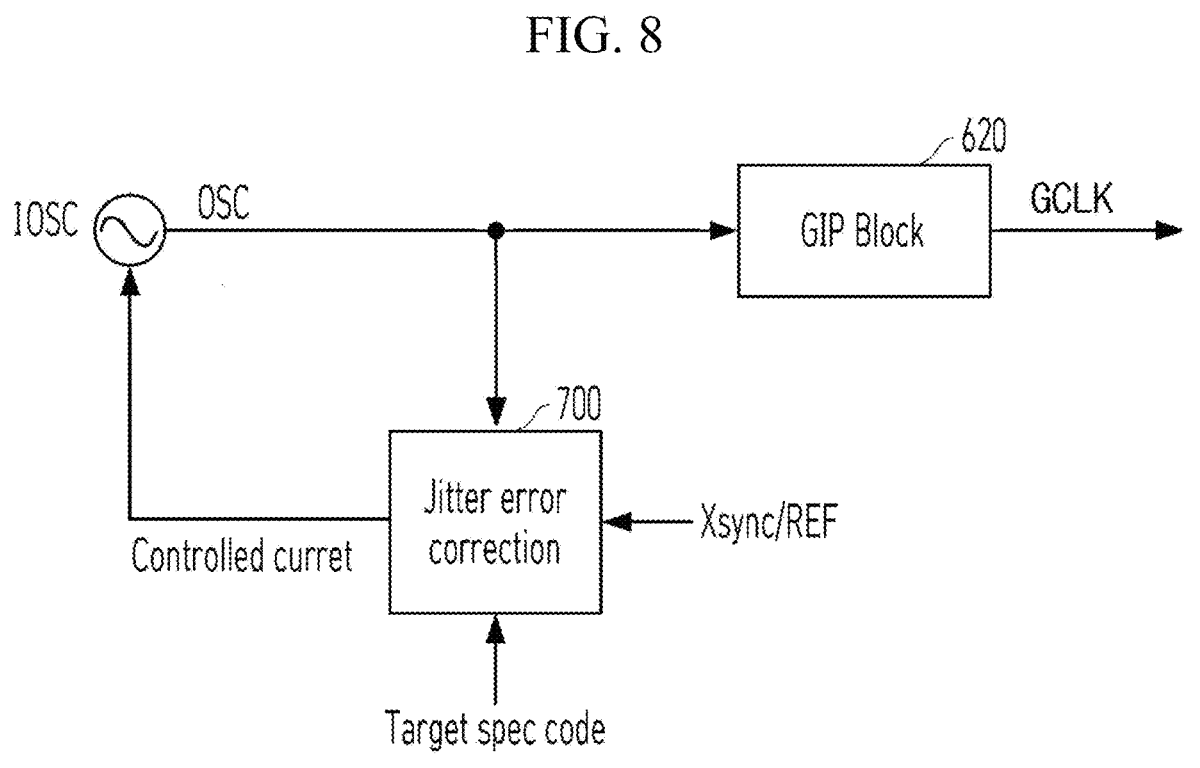

FIG. 8 is a block diagram schematically illustrating the configuration of the driver integrated circuit D-IC according to an aspect of the present disclosure.

Referring to FIG. 8, the driver integrated circuit D-IC can include the internal oscillator IOSC, the GIP signal generation circuit (GIP block) 620, and a jitter correction circuit (also indicated as jitter error correction in FIG. 8) 700.

The internal oscillator IOSC can output an internal oscillator signal OSC at a preset frequency. For preset frequency output, the frequency generation circuit (frequency locked loop (FLL) 600 as shown in FIG. 7) can be provided, but the present disclosure is not limited thereto.

The GIP signal generation circuit 620 can generate a GIP signal GCLK on the basis of the internal oscillator signal OSC. The GIP signal GCLK output from the GIP signal generation circuit 620 can be applied to the gate driver through a clock signal line disposed in the display panel 100. The clock signal line and a clock signal feedback line can be disposed in a non-active area of the display panel 100. The clock signal line and the clock signal feedback line can be formed of one material or of at least two materials.

For example, the clock signal line and the clock signal feedback line can be formed of one material, but can be formed of at least two materials if they do not intersect with other electrodes or wiring. In this case, the clock signal line and the clock signal feedback line can be formed of the same material as the material of at least one of a gate electrode, a source electrode, and a drain electrode and can be disposed on the same layer, but the present disclosure is not limited thereto. In addition, although not separately illustrated, the display panel 100 can include a bending portion (a region where the display panel can be bent). In this case, the clock signal line and the clock signal feedback line can have different laminated structures in parts passing through the bending portion, such as other signal lines or voltage lines, to alleviate bending stress.

The jitter correction circuit 700 can receive an externally input reference signal Sync CLK or REF CLK and a target jitter code in a digital code format. The jitter correction circuit 700 can calculate a jitter value by comparing the internal oscillator signal OSC output from an internal oscillator IOSC with the externally input reference signal Sync CLK or REF CLK. The jitter correction circuit 700 can compare the calculated jitter value with the target jitter code and apply a current control signal to the internal oscillator IOSC according to the comparison result.

Figure 9:
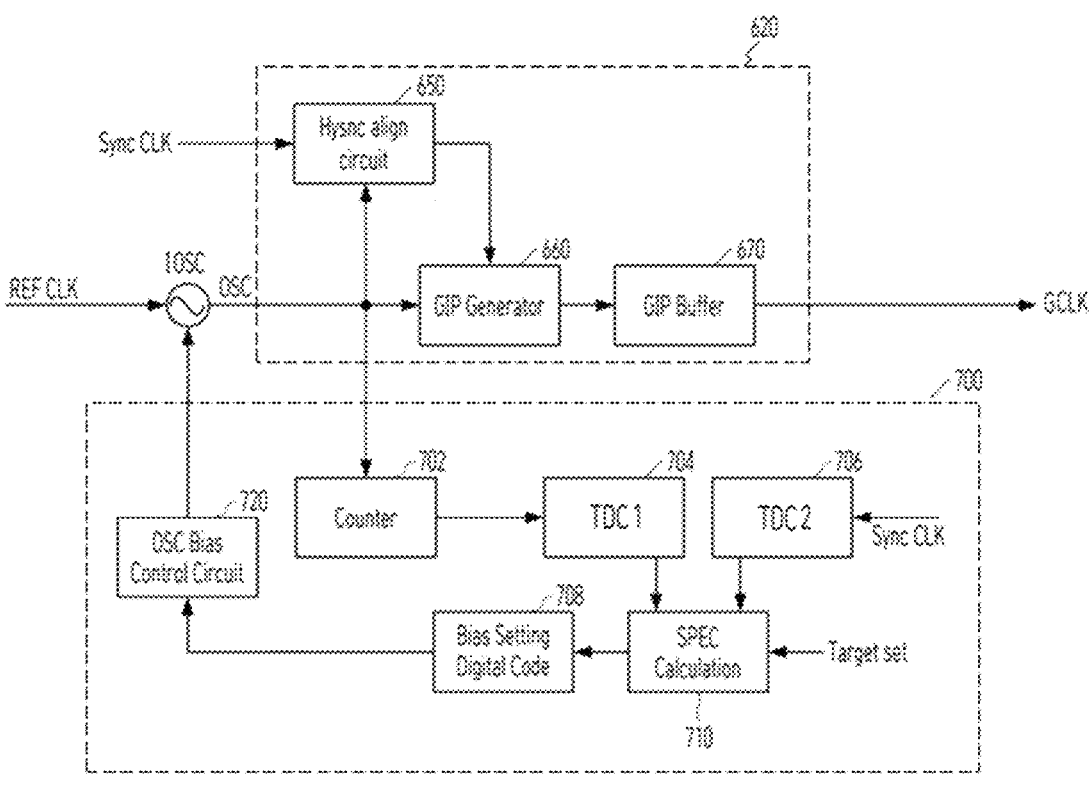
FIG. 9 is a block diagram illustrating a configuration of each block of the driver integrated circuit D-IC according to an aspect of the present disclosure.

FIG. 9 is a block diagram illustrating a detailed configuration of the driver integrated circuit D-IC of FIG. 8 and shows a detailed configuration of the GIP signal generation circuit 620 and the jitter correction circuit 700.

Figure 10:
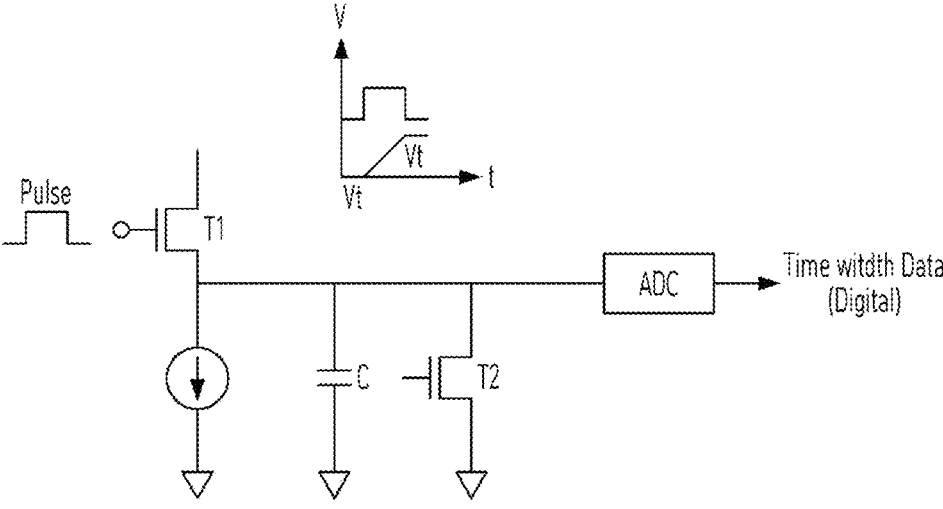
FIG. 10 is a circuit diagram illustrating a schematic configuration of a time-to-digital converter TDC in FIG. 9.
Figure 11:
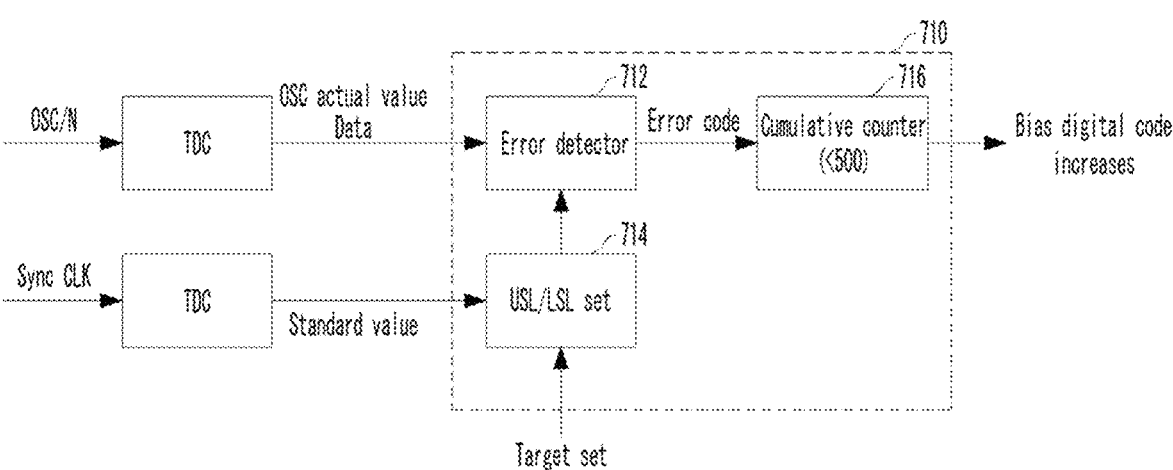
FIG. 11 and FIG. 12 are diagrams illustrating a configuration and a control method of a jitter calculator in FIG. 9.
Figure 12:
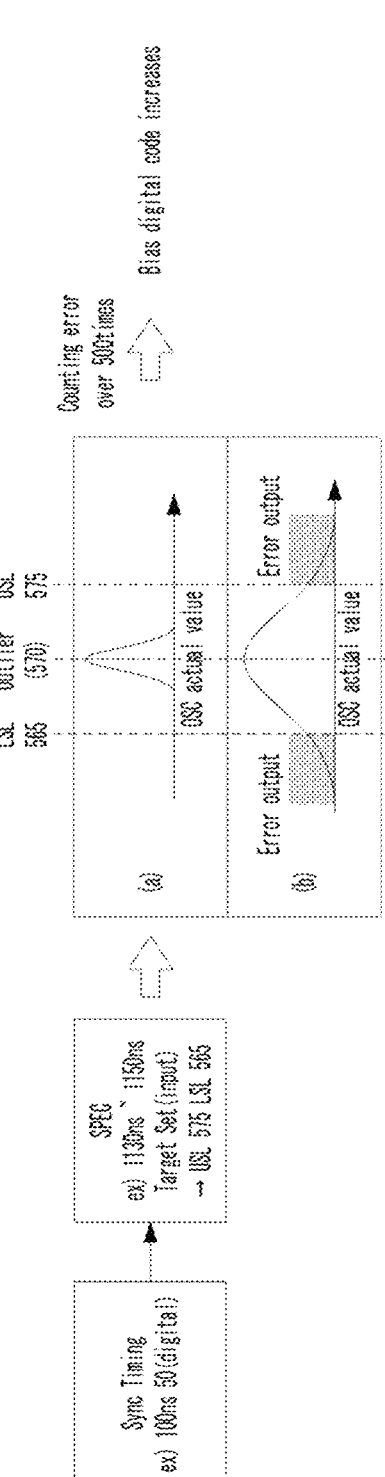
Figure 13:
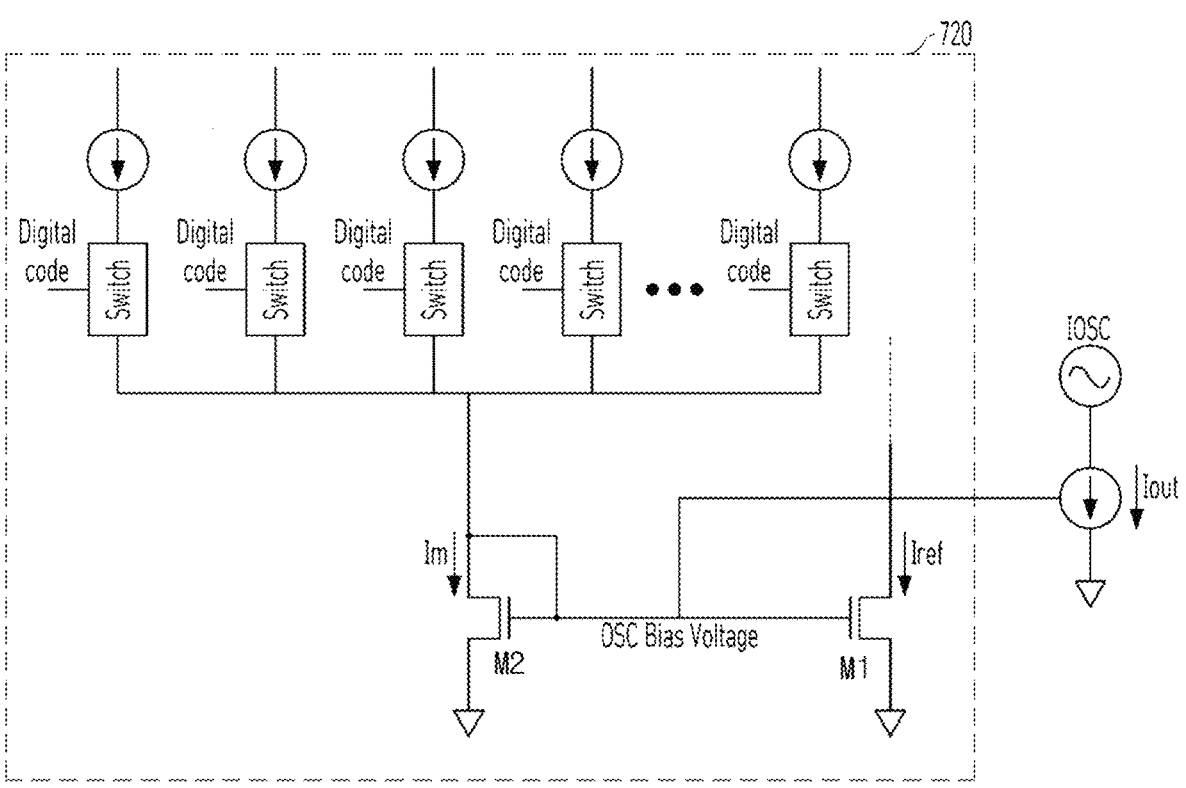
FIG. 13 is a diagram illustrating an oscillator signal OSC bias control circuit of the driver integrated circuit D-IC according to an aspect of the present disclosure.

Particularly, FIG. 9 is a block diagram illustrating a configuration of each block of the driver integrated circuit D-IC according to an aspect of the present disclosure, and FIG. 10 is a circuit diagram illustrating a schematic configuration of a time-to-digital converter (TDC) in FIG. 9. FIG. 11 and FIG. 12 are diagrams illustrating a configuration and control method of a jitter calculator in FIG. 9. FIG. 13 is a diagram illustrating an oscillator bias circuit of the driver integrated circuit D-IC according to one aspect of the present disclosure.

Referring to FIG. 9, the internal oscillator IOSC can output an internal oscillator signal OSC at a fixed frequency on the basis of an externally input reference signal REF CLK. The reference signal REF CLK is an externally input signal that serves as a reference in order to generate the internal oscillator signal OSC. For example, when the frequency generation circuit (frequency locked loop (FLL)) 600 in FIG. 7 is applied, the reference signal REF CLK can be an external oscillator signal EOSC applied from the outside.

The GIP signal generation circuit 620 can include a horizontal sync alignment circuit 650, a GIP signal generator (also indicated as GIP Generator in FIG. 9) 660, and a GIP buffer 670. The horizontal sync alignment circuit 650 can receive an external sync clock Sync CLK, align the internal oscillator signal OSC in one horizontal unit, and output the same to the GIP signal generator 660. The GIP signal generator 660 can generate the GIP signal GCLK based on the aligned internal oscillator signal OSC. The GIP buffer 670 can output the GIP signal GCLK to the gate driver (300 in FIG. 1).

The jitter correction circuit 700 can include a counter 702, a first TDC 704, a second TDC 706, a jitter calculator (indicated as SPEC Calculation in FIG. 9) 710, a bias setting circuit (indicated as Bias Setting Digital Code in FIG. 9) 708, and an OSC bias control circuit (also referred to as a bias control circuit hereinafter) 720.

The counter 702 can count the internal oscillator signal OSC and apply the count value to the first TDC 704. Since the internal oscillator signal OSC has a narrow pulse width and a short cycle, a jitter value can be processed by accumulating a plurality of internal oscillator signals OSC using the counter 702.

The first TDC 704 and the second TDC 706 can output TDC values of the internal oscillator signal OSC and the externally input reference signal Sync CLK or REF CLK, respectively. Here, a TDC can output a digital value corresponding to a time. For example, a TDC can output a digital value corresponding to the duration of a pulse width.

Referring to FIG. 10, the first TDC 704 and the second TDC 706 can include a first switch T1 that is turned on and applies a current during a pulse width period of an input pulse, a capacitor C that is charged by the current applied through the first switch T1, and a second switch T2 that transfers the voltage charged in the capacitor C to an analog-to-digital converter ADC. With this configuration, the TDC can turn on the first switch T1 during a period corresponding to the pulse width of the input pulse to apply current, and output the voltage charged by the applied current as a TDC value in the form of a digital value (Time Width Data).

The first TDC 704 can output a digital value (Time Width Data) corresponding to the pulse width of the internal oscillator signal OSC as a first TDC value. The first TDC 704 can output a time corresponding to accumulated pulse widths of a plurality of internal oscillator signals OSC counted using the counter 702 as a digital value.

The second TDC 706 can output a digital value (Time Width Data) corresponding to the pulse width of the externally input reference signal Sync CLK or REF CLK as a second TDC value.

The jitter calculator 710 compares the first TDC value and the second TDC value to calculate a jitter value. The jitter calculator 710 compares the calculated jitter value with a jitter target value (Target set) and outputs the calculation result to the bias setting circuit 708. The jitter target value (Target set) can be input from the outside or stored in advance. The jitter calculator 710 can output a bias adjustment signal to the bias setting circuit 708 if the jitter value is greater than the previously stored target value.

The bias setting circuit 708 can output bias adjustment data to the OSC bias control circuit 720 according to the bias adjustment signal.

The OSC bias control circuit 720 can apply a bias current to the internal oscillator IOSC according to the bias control data. As the amount of bias current increases, the output power of the internal oscillator signal OSC output from the internal oscillator IOSC increases, and thus jitter can be reduced. Here, as the output power of the internal oscillator IOSC increases, the jitter decreases, but power consumption can increase. Therefore, by optimizing the output power of the internal oscillator signal OSC within a range in which the jitter of the internal oscillator signal OSC does not exceed a target range, jitter performance can be guaranteed using minimum power.

FIG. 11 is a block diagram schematically illustrating the configuration of the jitter calculator 710 of FIG. 9, and FIG. 12 is a diagram illustrating a jitter correction method using the jitter calculator 710.

Referring to FIG. 11 and FIG. 12, the jitter calculator 710 can include an error detector 712, a standard setter (also indicated as USL/SLS set in FIG. 11) 714, and a cumulative counter 716. The standard setter 714 can receive the second TDC value from the second TDC 706. The second TDC value can be a digital value (Time Width Data) corresponding to the pulse width of the externally input reference signal Sync CLK or REF CLK. The standard setter 714 can set an upper specification limit (USL) and a lower specification limit (LSL) of the second TDC value and provide the same as error detection reference values to the error detector 712.

The error detector 712 receives the first TDC value from the first TDC 704. The first TDC value can be a digital value (Time Width Data) corresponding to the pulse width of the internal oscillator signal OSC. The error detector 712 can determine a jitter level by comparing the first TDC value with the second TDC value provided from the standard setter 714. If the first TDC value exceeds the range of the USL and the LSL, an error code can be generated upon determining that jitter is significant. For example, referring to FIG. 12, if the LSL and the USL are set by the standard setter 714, and a measured value (OSC actual value) of the internal oscillator signal OSC falls within the range of the LSL and the USL as in (a), it can be determined that jitter is insignificant. On the other hand, a signal existing in an area outside the range of the LSL and the USL as in (b) can be determined as a jitter error.

The cumulative counter 716 can count error codes and output a bias setting signal to the bias setting circuit (708 in FIG. 9) when more errors than a preset value occur for a predetermined period of time. Here, the bias setting circuit (708 in FIG. 9) can generate a digital code such that the bias current increases according to the bias setting signal.

FIG. 13 is a diagram illustrating the OSC bias control circuit (720 in FIG. 9) included in the driver integrated circuit D-IC according to an aspect of the present disclosure.

Referring to FIG. 13, the OSC bias control circuit 720 that controls a bias current I of an output line of the internal oscillator signal OSC can be implemented in the form of a current mirror.

The OSC bias control circuit 720 can be implemented using a first MOSFET (metal oxide semiconductor field effect transistor) M1 and a second MOSFET M2. The gate electrodes of the first MOSFET M1 and the second MOSFET M2 can be connected to a common node. The common node can be connected to the output line of the internal oscillator signal OSC.

A reference current Iref can be applied to the first MOSFET M1. The second MOSFET M2 can be connected to a plurality of switches that supply current by turning on/off according to a digital code provided by bias setting circuit (708 in FIG. 9). For example, each switch can be turned on when the digital code is 1 and turned off when the digital code is 0. As the number of turned-on switches increases, a current Im applied to the second MOSFET M2 increases, which can increase the voltage of the common node. As the voltage of the common node increases, the bias current Ibias that controls the output power of the internal oscillator signal OSC can also increase.

As described above, the display device according to the aspects of the present disclosure can calculate a jitter level by comparing a TDC value of the internal oscillator signal OSC output from the internal oscillator IOSC with a TDC value of the externally input reference signal Sync CLK or REF CLK, and increase the bias current applied to the internal oscillator IOSC when the amount of jitter exceeds a reference range. Therefore, by optimizing the bias current amount within a range in which jitter of the internal oscillator signal OSC does not exceed a target range, it is possible to guarantee jitter performance using a minimum current.

The aspects of the present disclosure have the following effects.

According to the aspects of the present disclosure, it is possible to provide a display device and a method of driving the same, which are capable of improving the display quality of the display device by reducing, minimizing or preventing panel noise.

According to the aspects of the present disclosure, it is possible to provide a display device and a method of driving the same, which are capable of reducing, minimizing or preventing noise by increasing a bias current such that the output power of an oscillator increases when a jitter of a reference clock signal output from the oscillator is lower than a target specification, for example, when a dispersion of the reference clock signal is wider than a target range.

According to the aspects of the present disclosure, it is possible to improve power efficiency and reduce or minimize power consumption by optimizing a jitter in the oscillator with minimum power consumption.

The effects according to the present disclosure are not limited to the description above and more diverse effects are included in the present disclosure.

It will be apparent to those skilled in the art that various modifications and variations can be made in the present disclosure without departing from the spirit or scope of the present disclosure. Thus, it is intended that the present disclosure covers the modifications and variations of the present disclosure provided they come within the scope of the appended claims and their equivalents.

What is claimed is:

1. A display device comprising:
a display panel configured to display an image;
a driving circuit including an oscillator configured to generate an oscillator signal having a preset frequency, the driving circuit configured to generate a gate clock signal to drive the display panel based on the oscillator signal; and
a jitter correction circuit configured to calculate a jitter of the oscillator signal based on an externally input reference frequency signal and the oscillator signal, and control output power of the oscillator depending on a calculation result to correct the jitter of the oscillator signal,
wherein the jitter correction circuit comprises:
a first time-to-digital converter (TDC) configured to output a digital value corresponding to a duration of a pulse width of the oscillator signal;
a second TDC configured to output a digital value corresponding to a duration of a pulse width of the reference frequency signal; and
a jitter calculator configured to output current control data when a jitter calculated from a first TDC value output from the first TDC and a second TDC value output from the second TDC is out of a range of a target jitter value.

2. The display device of claim 1, wherein the jitter correction circuit controls the output power of the oscillator to increase when the jitter of the oscillator signal is greater than a target jitter value.

3. The display device of claim 1, wherein the jitter correction circuit further comprises a counter configured to count a number of pulses of the oscillator signal to calculate a count value, and
wherein the first TDC outputs a digital value corresponding to a duration of accumulated pulse widths of the oscillator signal as the first TDC value.

4. The display device of claim 1, wherein the jitter correction circuit further comprises:
a bias setting circuit configured to generate bias adjustment data for controlling a current bias of the oscillator according to the current control data output from the jitter calculator; and
a bias control circuit configured to adjust an amount of bias current input to the oscillator according to the bias adjustment data.

5. The display device of claim 4, wherein the jitter calculator sets an upper specification limit (USL) and a lower specification limit (LSL) based on the second TDC value, calculates a first TDC value out of a range of the USL or the LSL as jitter, and outputs the current control data when a jitter accumulated for a certain period of time is out of the range of the target jitter value.

6. The display device of claim 4, wherein the bias control circuit further comprises a current mirror configured to control the current bias of the oscillator, and
wherein the bias control circuit further includes a plurality of switches turned on or off according to the bias adjustment data to apply a current to the current mirror.

7. The display device of claim 6, wherein the current mirror comprises a first metal oxide semiconductor field effect transistor (MOSFET) and a second MOSFET, and
wherein gate electrodes of the first MOSFET and the second MOSFET are connected to a common node connected to the oscillator.

8. The display device of claim 1, further comprising a gate driver configured to receive the gate clock signal and apply at least one of a scan signal or an emission signal to the display panel.

9. The display device of claim 1, wherein the oscillator generates the oscillator signal using a frequency locked loop (FLL).

10. A method of driving a display device, the method comprising:
generating an oscillator signal having a preset frequency using an oscillator;
generating a gate clock signal to drive a display panel of the display device based on the oscillator signal;
calculating a jitter of the oscillator signal based on an externally input reference frequency signal and the oscillator signal; and
controlling output power of the oscillator depending on a result of the calculating of the jitter of the oscillator signal to correct the jitter of the oscillator signal,
wherein the calculating of the jitter of the oscillator signal comprises:
generating a digital value corresponding to a duration of a pulse width of the oscillator signal as a first time-to-digital converter (TDC) value;
generating a digital value corresponding to a duration of a pulse width of the reference frequency signal as a second TDC value; and
calculating the jitter of the oscillator signal from the first TDC value and the second TDC value.

11. The method of claim 10, wherein when the jitter of the oscillator signal is greater than a target jitter value, the output power of the oscillator is controlled to increase, to correct the jitter of the oscillator signal.

12. The method of claim 11, wherein the generating of the digital value comprises counting the oscillator signal and generating a digital value corresponding to a duration of accumulated pulse widths of the oscillator signal as the first TDC value.

13. The method of claim 12, wherein the calculating of the jitter of the oscillator signal based on the externally input reference frequency signal and the oscillator signal comprises:
setting an upper specification limit (USL) and a lower specification limit (LSL) based on the second TDC value; and
calculating a first TDC value out of a range of the USL or the LSL as jitter and calculating a jitter accumulated for a predetermined period of time,
wherein the controlling the output power of the oscillator comprises applying a bias current to the oscillator to correct the jitter of the oscillator signal when an amount of the calculated accumulated jitter is out of the range of the target jitter value.

14. The method of claim 10, wherein the generating the oscillator signal having the preset frequency comprises generating the oscillator signal using a frequency locked loop (FLL).

15. The method of claim 10, wherein the gate clock signal is generated based on the oscillator signal for which the jitter has been corrected.

* * * * *